US012670833B2

(12) United States Patent
Byun et al.

(10) Patent No.: US 12,670,833 B2
(45) Date of Patent: Jun. 30, 2026

(54) GATE DRIVER AND DISPLAY APPARATUS INCLUDING THE SAME

(71) Applicant: Samsung Display Co., LTD., Yongin-si (KR)

(72) Inventors: Minwoo Byun, Yongin-si (KR); Minjoo Kim, Yongin-si (KR); Wonkyu Kwak, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/912,813

(22) Filed: Oct. 11, 2024

(65) Prior Publication Data

US 2025/0124846 A1 Apr. 17, 2025

(30) Foreign Application Priority Data

Oct. 11, 2023 (KR) ........................ 10-2023-0135451

(51) Int. Cl.
*G09G 3/20* (2006.01)

(52) U.S. Cl.
CPC ... *G09G 3/2092* (2013.01); *G09G 2310/0267* (2013.01); *G09G 2310/0275* (2013.01); *G09G 2310/08* (2013.01); *G09G 2330/021* (2013.01)

(58) Field of Classification Search
CPC ......... G09G 3/2092; G09G 2310/0267; G09G 2310/0275; G09G 2310/08; G09G 2330/021; G09G 2310/0286; G09G 2320/0247; G09G 3/3674; G09G 3/3266; G09G 3/32; G09G 2300/0426; G09G 2310/061; G09G 2320/0214; G11C 19/184; G11C 19/28
See application file for complete search history.

(56) References Cited

U.S. PATENT DOCUMENTS

| | | | | |
|---|---|---|---|---|
| 8,344,991 B2 * | 1/2013 | Hwang | .................. | G11C 19/28 345/100 |
| 10,714,044 B1 * | 7/2020 | Zhang | .................. | G09G 3/3677 |

(Continued)

FOREIGN PATENT DOCUMENTS

| | | |
|---|---|---|
| KR | 1020210024343 A | 3/2021 |
| KR | 1020220096831 A | 7/2022 |

(Continued)

OTHER PUBLICATIONS

Extended European Search Report dated Jan. 29, 2025 from the European Patent Office for European Patent Application No. 24205793.3, 14 pages.

*Primary Examiner* — Jose R Soto Lopez

(74) *Attorney, Agent, or Firm* — CANTOR COLBURN LLP

(57) ABSTRACT

A gate driver includes an input circuit, a pull-up circuit, a pull-down circuit, a QB node control circuit and a Q node control circuit. The input circuit transmits an input signal to a Q node in response to a first clock signal. The pull-up circuit pulls up a gate output signal to a high voltage in response to a signal of a QF node. The pull-down circuit pulls down the gate output signal to a low voltage in response to a QB node. The QB node control circuit controls a signal of the QB node based on a QB control signal and a second clock signal. The Q node control circuit controls a signal of the Q node based on the QB node.

28 Claims, 21 Drawing Sheets

(56) References Cited

U.S. PATENT DOCUMENTS

| | | | | |
|---|---|---|---|---|
| 2015/0348508 | A1* | 12/2015 | Her | G09G 3/3266<br>345/82 |
| 2018/0342187 | A1 | 11/2018 | Shan et al. | |
| 2019/0058029 | A1* | 2/2019 | Woo | G09G 3/3258 |
| 2019/0096306 | A1* | 3/2019 | Kong | G09G 3/20 |
| 2019/0156730 | A1* | 5/2019 | Lim | G11C 19/28 |
| 2019/0378462 | A1* | 12/2019 | Chung | G11C 19/28 |
| 2019/0378463 | A1* | 12/2019 | Chung | G09G 3/3225 |
| 2020/0027389 | A1* | 1/2020 | Kang | G09G 3/3266 |
| 2020/0043404 | A1* | 2/2020 | Yu | G09G 3/3266 |
| 2021/0065599 | A1 | 3/2021 | Feng | |
| 2021/0201808 | A1* | 7/2021 | Yu | G09G 3/2003 |
| 2021/0358366 | A1* | 11/2021 | Feng | G09G 3/3266 |
| 2022/0084470 | A1* | 3/2022 | Park | G09G 3/3266 |
| 2023/0139398 | A1* | 5/2023 | Kim | G09G 3/3233<br>345/214 |
| 2024/0257763 | A1* | 8/2024 | Bong | G09G 3/3266 |

FOREIGN PATENT DOCUMENTS

| | | | |
|---|---|---|---|
| KR | 102486663 | B1 | 1/2023 |
| KR | 1020230009228 | A | 1/2023 |

* cited by examiner

GATE DRIVER AND DISPLAY APPARATUS INCLUDING THE SAME

This application claims priority to Korean Patent Application No. 10-2023-0135451, filed on Oct. 11, 2023, and all the benefits accruing therefrom under 35 U.S.C. § 119, the content of which in its entirety is herein incorporated by reference.

BACKGROUND

1. Field

Embodiments of the invention relate to a gate driver and a display apparatus including the gate driver. More particularly, embodiments of the invention relate to a gate driver with reduced power consumption and a display apparatus including the gate driver.

2. Description of the Related Art

Generally, a display apparatus includes a display panel and a display panel driver. The display panel may include a plurality of gate lines, a plurality of data lines, a plurality of emission lines and a plurality of pixels. The display panel driver may include a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

SUMMARY

A display panel and a display panel driver of a display apparatus may include a P-type transistor or an N-type transistor. To prevent a current leakage, the display panel may include the N-type transistors only. In a display apparatus where the display panel includes the N-type transistors only and the gate driver integrated on the display panel includes the P-type transistor, a manufacturing process may become complicated and a current leakage may occur in the gate driver.

In addition, a flicker may occur on the display panel due to the current leakage so that a display quality of the display panel may be deteriorated.

Embodiments of the invention provide a gate driver with reduced power consumption.

Embodiments of the invention provide a display apparatus including the gate driver.

In an embodiment of a gate driver according to the invention, the gate driver includes an input circuit, a pull-up circuit, a pull-down circuit, a QB node control circuit and a Q node control circuit. In such an embodiment, the input circuit transmits an input signal to a Q node in response to a first clock signal. In such an embodiment, the pull-up circuit pulls up a gate output signal to a high voltage in response to a signal of a QF node. In such an embodiment, the pull-down circuit pulls down the gate output signal to a first low voltage in response to a QB node. In such an embodiment, the QB node control circuit controls a signal of the QB node based on a QB control signal and a second clock signal. In such an embodiment, the Q node control circuit controls a signal of the Q node based on the QB node.

In an embodiment, the gate driver may further include a carry pull-up circuit which pulls up a carry signal to the high voltage in response to the signal of the QF node and a carry pull-down circuit which pulls down the carry signal to a second low voltage less than the first low voltage in response to the signal of the QB node.

In an embodiment, the carry pull-up circuit may include a fifth transistor including a control electrode connected to the QF node, a first electrode which receives the high voltage and a second electrode connected to a carry output terminal. In such an embodiment, the carry pull-down circuit may include a sixth transistor including a control electrode connected to the QB node, a first electrode which receives the second low voltage and a second electrode connected to the carry output terminal.

In an embodiment, the gate driver may further include a boosting circuit which boosts the QF node using the second clock signal in response to the signal of the QF node.

In an embodiment, the boosting circuit may include a fourth transistor including a control electrode connected to the QF node, a first electrode which receives the second clock signal and a second electrode connected to a second electrode of a first capacitor and the first capacitor including a first electrode connected to the QF node and the second electrode.

In an embodiment, the input circuit may include a first first transistor including a control electrode which receives the first clock signal, a first electrode which receives the input signal and a second electrode connected to a first intermediate node and a second first transistor including a control electrode which receives the first clock signal, a first electrode connected to the first intermediate node and a second electrode connected to the Q node.

In an embodiment, the gate driver may further include a third transistor including a control electrode which receives the high voltage, a first electrode connected to the Q node and a second electrode connected to the QF node.

In an embodiment, the Q node control circuit may include a first second transistor including a control electrode connected to the QB node, a first electrode connected to a second intermediate node and a second electrode connected to the Q node and a second second transistor including a control electrode connected to the QB node, a first electrode which receives a second low voltage and a second electrode connected to the second intermediate node.

In an embodiment, the second second transistor may further include a second control electrode which receives the second low voltage.

In an embodiment, the gate driver may further include a thirteenth transistor which applies a second low voltage to the QB node in response to the signal of the Q node.

In an embodiment, the gate driver may further include a reset circuit which applies the first low voltage to the Q node in response to a reset signal.

In an embodiment, the reset circuit may include a second fifteenth transistor including a control electrode which receives the reset signal, a first electrode which receives the first low voltage and a second electrode connected to a fifteenth intermediate node and a first fifteenth transistor including a control electrode which receives the reset signal, a first electrode connected to the fifteenth intermediate node and a second electrode connected to the Q node.

In an embodiment, the pull-up circuit may include a seventh transistor including a control electrode connected to the QF node, a first electrode which receives the high voltage and a second electrode connected to a gate output terminal and a second capacitor connected to the control electrode of the seventh transistor and the second electrode of the seventh transistor.

In an embodiment, the QB node control circuit may include a first ninth transistor including a control electrode which receives the QB control signal, a first electrode connected to a control electrode of a tenth transistor and a second electrode connected to a ninth intermediate node, a second ninth transistor including a control electrode which receives the QB control signal, a first electrode connected to the ninth intermediate node and a second electrode which receives the QB control signal, the tenth transistor including the control electrode connected to the first electrode of the first ninth transistor, a first electrode which receives the QB control signal and a second electrode connected to a first electrode of an eleventh transistor and the eleventh transistor including a control electrode which receives the second clock signal, the first electrode connected to the second electrode of the tenth transistor and a second electrode connected to the QB node.

In an embodiment, the QB node control circuit may further include a third capacitor including a first electrode connected to the control electrode of the tenth transistor and a second electrode connected to the QB node.

In an embodiment, the gate driver may further include a first first transistor including a control electrode which receive the first clock signal, a first electrode which receives the input signal and a second electrode connected to a first intermediate node, a second first transistor including a control electrode which receives the first clock signal, a first electrode connected to the first intermediate node and a second electrode connected to the Q node, a first second transistor including a control electrode connected to the QB node, a first electrode connected to a second intermediate node and a second electrode connected to the Q node, a second second transistor including a control electrode connected to the QB node, a first electrode which receives a second low voltage and a second electrode connected to the second intermediate node and a stabilizing circuit which applies the high voltage to the first intermediate node and the second intermediate node in response to the signal of the Q node.

In an embodiment, the stabilizing circuit may include a second fourteenth transistor including a control electrode connected to the Q node, a first electrode connected to a fourteenth intermediate node and a second electrode connected to the first intermediate node and the second intermediate node and a first fourteenth transistor including a control electrode connected to the Q node, a first electrode which receives the high voltage and a second electrode connected to the fourteenth intermediate node.

In an embodiment, the gate driver may further include a boosting circuit which boosts the QF node using the second clock signal in response to the signal of the QF node. In such an embodiment, the boosting circuit may include a fourth transistor including a control electrode connected to the QF node, a first electrode which receives the second clock signal and a second electrode connected to a second electrode of a first capacitor and the first capacitor including a first electrode connected to the QF node and the second electrode. In such an embodiment, the gate driver may further include a sixteenth transistor which applies the first low voltage to the second electrode of the fourth transistor in response to the first clock signal.

In an embodiment, all transistors in the gate driver may be N-type transistors.

In an embodiment, the QB control signal may be the high voltage.

In an embodiment, the QB control signal may not be the high voltage.

In an embodiment, a high level of the first clock signal may be the high voltage. In such an embodiment, a low level of the first clock signal may be a second low voltage less than the first low voltage.

In an embodiment, a high level of the first clock signal may be different from the high voltage or a low level of the first clock signal may be different from a second low voltage less than the first low voltage.

In an embodiment of a gate driver according to the invention, the gate driver includes an input circuit, a pull-up circuit, a pull-down circuit, a QB node control circuit and a Q node control circuit. In such an embodiment, the input circuit transmits an input signal to a Q node in response to a first carry clock signal. In such an embodiment, the pull-up circuit outputs a second clock signal as a gate output signal in response to a signal of the Q node. In such an embodiment, the pull-down circuit pulls down the gate output signal to a low voltage in response to a signal of a QB node. In such an embodiment, the QB node control circuit controls the signal of the QB node based on a QB control signal. In such an embodiment, the Q node control circuit controls the signal of the Q node based on the signal of the QB node and a second carry clock signal.

In an embodiment, the QB node control circuit may include a first ninth transistor including a control electrode which receives the QB control signal and a first electrode connected to a control electrode of a tenth transistor, a second ninth transistor including a control electrode which receives the QB control signal, a first electrode connected to a ninth intermediate node and a second electrode which receives the QB control signal and the tenth transistor including the control electrode connected to the first electrode of the first ninth transistor, a first electrode which receives the QB control signal and a second electrode connected to the QB node.

In an embodiment, the QB node control circuit may further include a third capacitor including a first electrode connected to the control electrode of the tenth transistor and a second electrode connected to the QB node.

In an embodiment, the Q node control circuit may include a seventeenth transistor including a control electrode which receives the second carry clock signal, a first electrode connected to the Q node and a second electrode connected to a seventeenth intermediate node and an eighteenth transistor including a control electrode connected to the QB node, a first electrode connected to the seventeenth intermediate node and a second electrode connected to a carry output terminal.

In an embodiment of a display apparatus according to the invention, the display apparatus includes a display panel, a gate driver, a data driver and an emission driver. In such an embodiment, the display panel includes a pixel. In such an embodiment, the gate driver outputs a gate signal to the pixel. In such an embodiment, the data driver outputs a data voltage to the pixel. In such an embodiment, the emission driver outputs an emission signal to the pixel. In such an embodiment, the gate driver includes an input circuit, a pull-up circuit, a pull-down circuit, a QB node control circuit and a Q node control circuit. In such an embodiment, the input circuit transmits an input signal to a Q node in response to a first clock signal. In such an embodiment, the pull-up circuit pulls up a gate output signal to a high voltage in response to a signal of a QF node. In such an embodiment, the pull-down circuit pulls down the gate output signal to a low voltage in response to a QB node. In such an embodiment, the QB node control circuit controls a signal of the QB node based on a QB control signal and a second clock signal.

In such an embodiment, the Q node control circuit controls a signal of the Q node based on the QB node.

According to embodiments of the gate driver and the display apparatus including the gate driver, all transistors in the gate driver may be configured as the N-type transistors. In such embodiments, the gate driver may not include the P-type transistors but include the N-type transistors only.

In such embodiments, to prevent the current leakage, the display panel includes the N-type transistors only and the gate driver integrated on the display panel also includes the N-type transistors only so that the manufacturing process may become simplified and the current leakage may be effectively prevented in the gate driver. In such embodiments, the flicker due to the current leakage may be effectively prevented so that the display quality of the display panel may be enhanced.

In such embodiments, the reliability and the stability of the gate output signal may be enhanced and the power consumption may be reduced.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION

Figure 1:
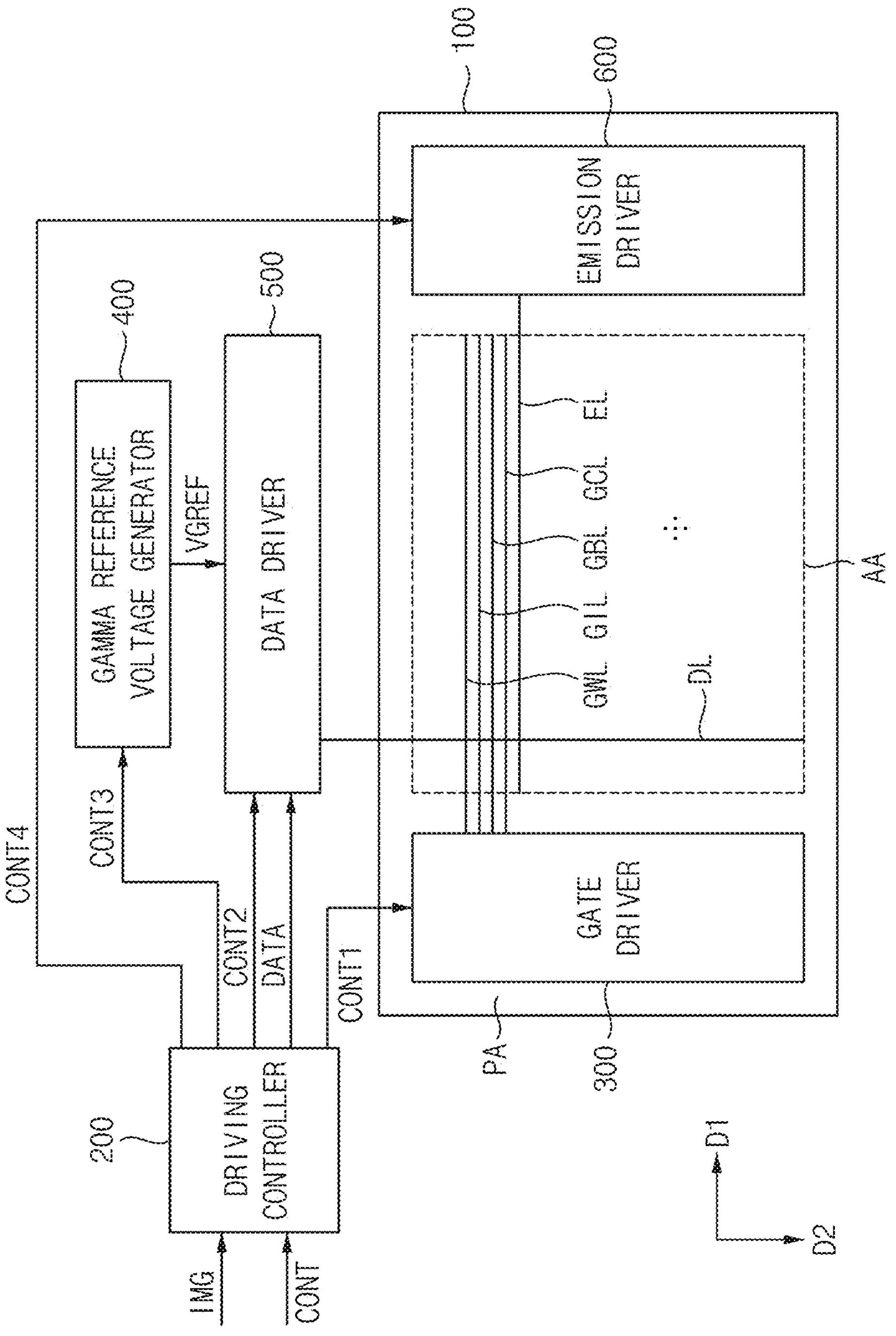
FIG. 1 is a block diagram illustrating a display apparatus according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly Indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

FIG. 1 is a block diagram illustrating a display apparatus according to an embodiment of the invention.

Referring to FIG. 1, an embodiment of the display apparatus includes a display panel 100 and a display panel driver. The display panel driver includes a driving controller 200, a gate driver 300, a gamma reference voltage generator 400, a data driver 500 and an emission driver 600.

The display panel 100 has a display region AA on which an image is displayed and a peripheral region PA adjacent to the display region AA.

The display panel 100 may include a plurality of gate lines GWL, GIL, GBL and GCL, a plurality of data lines DL, a plurality of emission lines EL and a plurality of pixels electrically connected to the gate lines GWL, GIL, GBL and GCL, the data lines DL and the emission lines EL. The gate lines GWL, GIL, GBL and GCL may extend in a first direction D1, the data lines DL may extend in a second direction D2 crossing the first direction D1 and the emission lines EL may extend in the first direction D1.

The driving controller 200 may receive input image data IMG and an input control signal CONT from an external apparatus. In an embodiment, for example, the input image data IMG may include red image data, green image data and blue image data. The input image data IMG may further include white image data. In an embodiment, for example the input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GWL, GIL, GBL and GCL in response to the first control signal CONT1 received from the driving controller 200. The gate driver 300 may output the gate signals to the gate lines GWL, GIL, GBL and GCL. In an embodiment, for example, the gate driver 300 may be integrated on the peripheral region PA of the display panel 100. In an embodiment, for example, the gate driver 300 may be mounted on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF is used for converting the data signal DATA into the data voltage having an analog type.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signals DATA into the data voltages having an analog type using the gamma reference voltages VGREF. The data driver 500 outputs the data voltages to the data lines DL.

The emission driver 600 generates emission signals to drive the emission lines EL in response to the fourth control signal CONT4 received from the driving controller 200. The emission driver 600 may output the emission signals to the emission lines EL. In an embodiment, for example, the emission driver 600 may be integrated on the peripheral region PA of the display panel 100. In an embodiment, for example, the emission driver 600 may be mounted on the peripheral region PA of the display panel 100.

Although an embodiment where the gate driver 300 is disposed at a first side of the display panel 100 and the emission driver 600 is disposed at a second side of the display panel 100 opposite to the first side is shown in FIG. 1 for convenience of illustration and description, the invention may not be limited thereto. In an embodiment, for example, both of the gate driver 300 and the emission driver 600 may be disposed at the first side of the display panel 100. In an embodiment, for example, the gate driver 300 and the emission driver 600 may be integrally formed as a single driver or a circuit chip.

Figure 2:
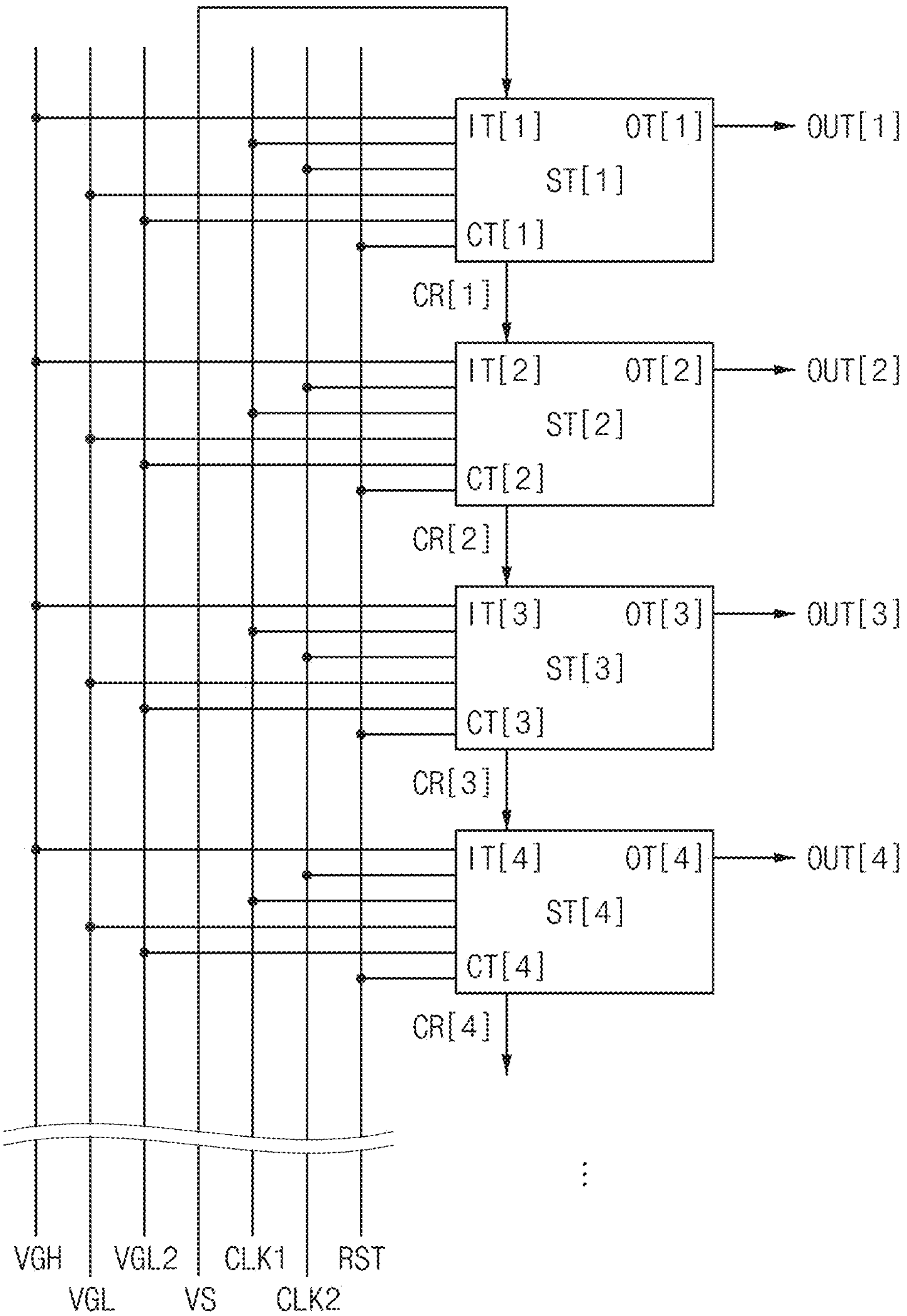
FIG. 2 is a block diagram illustrating an embodiment of a gate driver of FIG. 1.

FIG. 2 is a block diagram illustrating an embodiment of the gate driver 300 of FIG. 1.

Referring to FIGS. 1 and 2, in an embodiment, the gate driver 300 may include a plurality of stages ST[1], ST[2], ST[3] and ST[4].

A high voltage VGH, a low voltage (or a first low voltage) VGL, a second low voltage VGL2, a first clock signal CLK1 and a second clock signal CLK2 may be applied to each of the stages ST[1], ST[2], ST[3] and ST[4]. In addition, a reset signal RST may be applied to each of the stages ST[1], ST[2], ST[3] and ST[4].

In an embodiment, for example, the second low voltage VGL2 may have a level lower than a level of the low voltage VGL.

The first clock signal CLK1 and the second clock signal CLK2 may be alternately applied to one input terminal of each of the stages ST[1], ST[2], ST[3] and ST[4]. In an embodiment, for example, the first clock signal CLK1 may be applied to a first clock terminal of a first stage ST[1] and the second clock signal CLK2 may be applied to a second clock terminal of the first stage ST[1]. In such an embodiment, the second clock signal CLK2 may be applied to a first clock terminal of a second stage ST[2] and the first clock signal CLK1 may be applied to a second clock terminal of the second stage ST[2].

Like the first stage ST[1], the first clock signal CLK1 may be applied to a first clock terminal of a third stage ST[3] and the second clock signal CLK2 may be applied to a second clock terminal of the third stage ST[3]. Like the second stage ST[2], the second clock signal CLK2 may be applied to a first clock terminal of a fourth stage ST[4] and the first clock signal CLK1 may be applied to a second clock terminal of the fourth stage ST[4].

The vertical start signal VS may be applied to an input terminal IT[1] of the first stage ST[1]. A first carry signal CR[1] of the first stage ST[1] may be applied to an input terminal IT[2] of the second stage ST[2]. A second carry signal CR[2] of the second stage ST[2] may be applied to an input terminal IT[3] of the third stage ST[3]. A third carry signal CR[3] of the third stage ST[3] may be applied to an input terminal IT[4] of the fourth stage ST[4].

Carry terminals CT [1] to CT [4] of the first to fourth stages ST[1] to ST[4] may output first to fourth carry signals CR[1] to CR[4], respectively.

Gate output terminals OT[1] to OT[4] of the first to fourth stages ST[1] to ST[4] may output first to fourth gate output signals OUT[1] to OUT[4], respectively.

Figure 3:
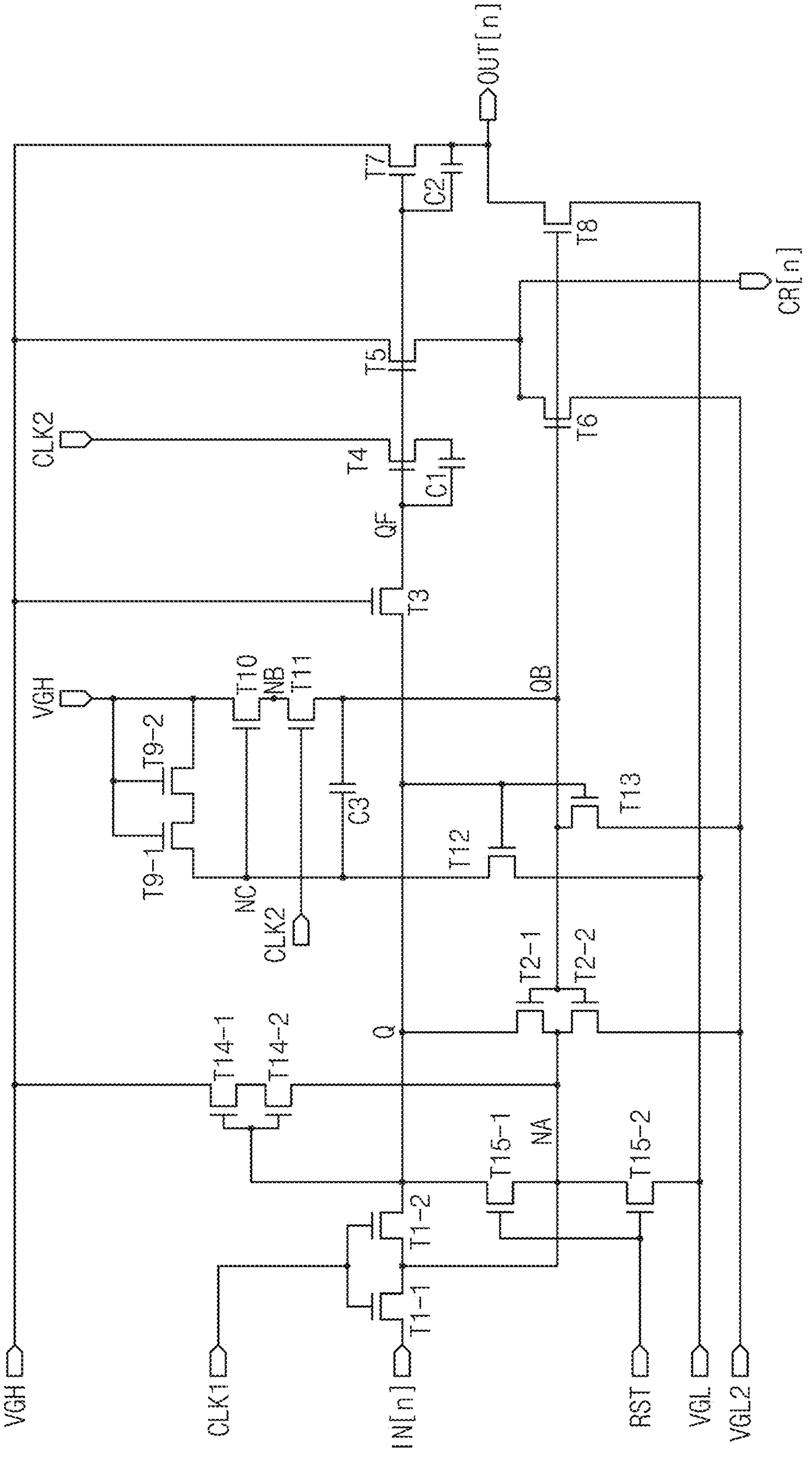
FIG. 3 is a circuit diagram illustrating an embodiment of a stage of the gate driver of FIG. 2.
Figure 4:
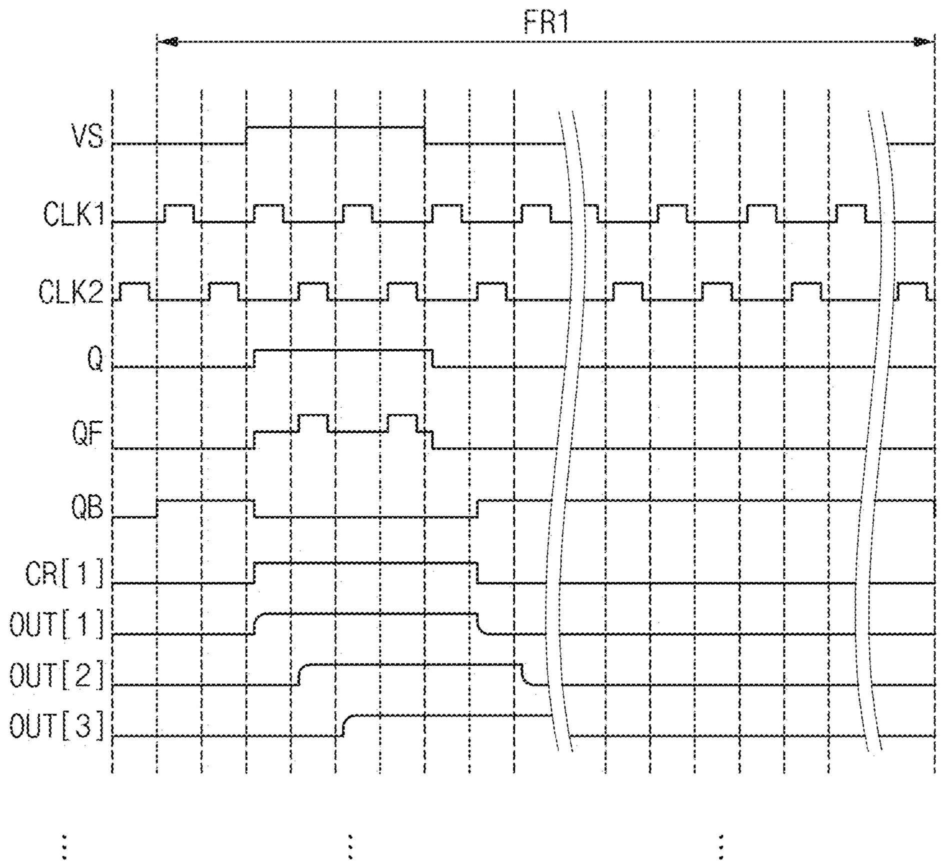
FIG. 4 is a signal timing diagram illustrating input signals, node signals and output signals of the gate driver of FIG. 2.

FIG. 3 is a circuit diagram illustrating an embodiment of the stage of the gate driver 300 of FIG. 2. FIG. 4 is a signal timing diagram illustrating input signals, node signals and output signals of the gate driver 300 of FIG. 2.

Referring to FIGS. 1 to 4, an embodiment of the stage of the gate driver 300 includes a pull-up circuit that pulls up the gate output signal OUT[n] to the high voltage VGH in response to a signal of a QF node, a pull-down circuit that pulls down the gate output signal OUT[n] to the low voltage VGL in response to a signal of a QB node, and a QB node control circuit that controls the signal (or voltage) of the QB node based on a QB control signal (e.g. VGH). In an embodiment, the QB control signal may be the high voltage VGH.

In an embodiment, for example, the pull-up circuit may include a seventh transistor T7 including a control electrode connected to the QF node, a first electrode that receives the high voltage VGH and a second electrode connected to a gate output terminal, and a second capacitor C2 connected to the control electrode of the seventh transistor T7 and the second electrode of the seventh transistor T7. The second capacitor C2 may be a boosting capacitor that boosts the pull-up of the gate output signal OUT[n].

In an embodiment, for example, the pull-down circuit may include an eighth transistor T8.

The QB node control circuit may include a first ninth transistor T9-1 including a control electrode that receives the QB control signal (e.g. VGH), a first electrode connected to a control electrode NC of a tenth transistor T10 and a second electrode connected to a ninth intermediate node, a second ninth transistor T9-2 including a control electrode that receives the QB control signal (e.g. VGH), a first electrode connected to the ninth intermediate node and a second electrode that receives the QB control signal (e.g. VGH), the tenth transistor T10 including the control electrode NC connected to the first electrode of the first ninth transistor T9-1, a first electrode that receives the QB control signal (e.g. VGH) and a second electrode connected to a first electrode NB of an eleventh transistor T11, and the eleventh transistor T11 including a control electrode that receives the second clock signal CLK2, a first electrode connected to the second electrode of the tenth transistor T10 and a second electrode connected to the QB node.

The QB node control circuit may further include a third capacitor C3 including a first electrode connected to the control electrode of the tenth transistor T10 and a second electrode connected to the QB node.

The third capacitor C3 may accelerate the turn-on and the turn-off of the tenth transistor T10 so that the display apparatus may operate quickly.

The stage of the gate driver 300 may further include a twelfth transistor T12 that applies the low voltage VGL to the control electrode of the tenth transistor T10 in response to the signal of the Q node.

When the signal of the Q node has a high level, the twelfth transistor T12 may be turned on, such that the low voltage VGL may be applied to the control electrode of the tenth transistor T10 by the twelfth transistor T12. When the low voltage VGL is applied to the control electrode of the tenth transistor T10, the tenth transistor T10 may be turned off. There is a period when both of the signal of the Q node and the QB control signal (e.g. VGH) have high levels. In the period when both of the signal of the Q node and the QB control signal (e.g. VGH) have high levels, the first ninth transistor T9-1, the second ninth transistor T9-2 and the twelfth transistor T12 may be turned on. When the first ninth transistor T9-1, the second ninth transistor T9-2 and the twelfth transistor T12 are turned on, a voltage drop may occur due to resistance components of the first ninth transistor T9-1 and the second ninth transistor T9-2 such that the signal of the control electrode of the tenth transistor T10 may maintain a level of the low voltage VGL. Thus, even though both of the signal of the Q node and the QB control signal (e.g. VGH) have high levels, the tenth transistor T10 may maintain a turned-off state well. Herein, the first ninth transistor T9-1 and the second ninth transistor T9-2 may function as an inverter including a diode connection.

In an embodiment, even though the eleventh transistor T11 turns on and off repeatedly by the second clock signal CLK2 applied to the eleventh transistor T11, the signal of the QB node may stably maintain the low level by the third capacitor C3 and a parasitic capacitance of the eleventh transistor T11. Thus, even though the eleventh transistor T11 turns on and off repeatedly, the gate output signal OUT[n] and the carry signal CR[n] may stably output respective high levels.

The stage of the gate driver 300 may further include a carry pull-up circuit that pulls up the carry signal CR[n] to the high voltage VGH in response to the signal of the QF node and a carry pull-down circuit that pulls down the carry signal CR[n] to the second low voltage VGL2.

The carry pull-up circuit may include a fifth transistor T5 including a control electrode connected to the QF node, a first electrode that receives the high voltage VGH and a second electrode connected to a carry output terminal.

The carry pull-down circuit may include a sixth transistor T6 including a control electrode connected to the QB node, a first electrode that receives the second low voltage VGL2 and a second electrode connected to the carry output terminal.

The stage of the gate driver 300 may further include a boosting circuit that boosts the QF node using the second clock signal CLK2 in response to the signal of the QF node.

The boosting circuit may include a fourth transistor T4 including a control electrode connected to the QF node, a first electrode that receives the second clock signal CLK2 and a second electrode connected to a second electrode of a first capacitor C1, and the first capacitor C1 including a first electrode connected to the QF node and the second electrode.

The stage of the gate driver 300 may further include an input circuit that transmits an input signal IN[n] to the Q node in response to the first clock signal CLK1

The input circuit may include a first first transistor T1-1 including a control electrode that receives the first clock signal CLK1, a first electrode that receives the input signal IN[n] and a second electrode connected to a first intermediate node, and a second first transistor T1-2 including a control electrode that receives the first clock signal CLK1, a first electrode connected to the first intermediate node and a second electrode connected to the Q node.

The stage of the gate driver 300 may further include a third transistor T3 including a control electrode that receives the high voltage VGH, a first electrode connected to the Q node and a second electrode connected to the QF node.

The stage of the gate driver 300 may further include a Q node control circuit that applies the second low voltage VGL2 to the Q node in response to the signal of the QB node.

The Q node control circuit may include a first second transistor T2-1 including a control electrode connected to the QB node, a first electrode connected to a second intermediate node and a second electrode connected to the Q node, and a second second transistor T2-2 including a control electrode connected to the QB node, a first electrode that receives the second low voltage VGL2 and a second electrode connected to the second intermediate node.

The stage of the gate driver 300 may further include a thirteenth transistor T13 that applies the second low voltage VGL2 to the QB node in response to the signal of the Q node.

The stage of the gate driver 300 may further include a reset circuit that applies the low voltage VGL to the Q node in response to the reset signal RST.

The reset circuit may include a second fifteenth transistor T15-2 including a control electrode that receives the reset signal RST, a first electrode that receives the low voltage VGL and a second electrode connected to a fifteenth intermediate node, and a first fifteenth transistor T15-1 including a control electrode that receives the reset signal RST, a first electrode connected to the fifteenth intermediate node and a second electrode connected to the Q node.

The reset signal RST may have an active level in an initial turning-on period of the display apparatus. An unintentional or undesired light emission may be effectively prevented in the initial turning-on period of the display apparatus by the reset signal RST.

The stage of the gate driver 300 may further include a stabilizing circuit that applies the high voltage VGH to the first intermediate node NA and the second intermediate node NA in response to the signal of the Q node. The stabilizing circuit may also apply the high voltage VGH to the fifteenth intermediate node NA.

The stabilizing circuit may include a second fourteenth transistor T14-2 including a control electrode connected to the Q node, a first electrode connected to a fourteenth intermediate node and a second electrode connected to the first intermediate node, the second intermediate node and the fifteenth intermediate node, and a first fourteenth transistor T14-1 including a control electrode connected to the Q node, a first electrode that receives the high voltage VGH and a second electrode connected to the fourteenth intermediate node.

FIG. 4 illustrates the vertical start signal VS, the first clock signal CLK1, the second clock signal CLK2, the signal of the Q node, the signal of the QF node, the signal of the QB node, the carry signal CR[1], the gate output signals OUT[1], OUT[2] and OUT[3] in a first frame. The waveforms of the above signals of the first frame may be repeated in a second frame.

Figure 5:
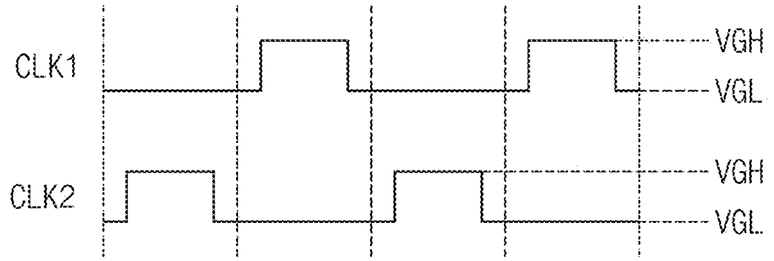
FIG. 5 is a signal timing diagram illustrating examples of a first clock signal and a second clock signal of FIG. 4.
Figure 6:
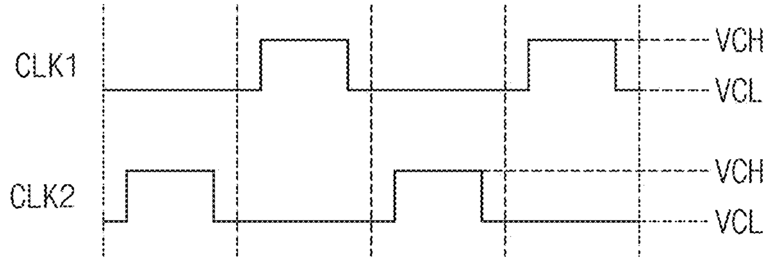
FIG. 6 is a signal timing diagram illustrating examples of a first clock signal and a second clock signal of FIG. 4.

FIG. 5 is a signal timing diagram illustrating examples of the first clock signal CLK1 and the second clock signal CLK2 of FIG. 4. FIG. 6 is a signal timing diagram illustrating examples of the first clock signal CLK1 and the second clock signal CLK2 of FIG. 4.

Referring to FIGS. 1 to 5, a high level of the first clock signal CLK1 may be the high voltage VGH and a low level of the first clock signal CLK1 may be the second low voltage VGL2 less than the first low voltage VGL. In addition, a high level of the second clock signal CLK2 may be the high voltage VGH and a low level of the second clock signal CLK2 may be the second low voltage VGL2.

In such an embodiment, the high levels and the low levels of the first clock signal CLK1 and the second clock signal CLK2 are the high voltage VGH and the second low voltage VGL2 which are power voltages of the gate driver 300 so that the power voltages used in the display apparatus may be simplified, and accordingly, the circuit of the display apparatus may be simplified.

Referring to FIGS. 1 to 4 and 6, a high level of the first clock signal CLK1 may be a voltage VCH different from the high voltage VGH and a low level of the first clock signal CLK1 may be a voltage VCL different from the second low voltage VGL2. In addition, a high level of the second clock signal CLK2 may be the voltage VCH different from the high voltage VGH and a low level of the second clock signal CLK2 may be the voltage VCL different from the second low voltage VGL2.

In an embodiment, for example, the high level VCH of the first clock signal CLK1 and the second clock signal CLK2 may be less than the high voltage VGH. In an embodiment, for example, the low level VCL of the first clock signal CLK1 and the second clock signal CLK2 may be greater than the second low voltage VGL2.

In such an embodiment, a difference between the high level and the low level of the first clock signal CLK1 and the second clock signal CLK2 may be less than a difference between the high level and the low level of the first clock signal CLK1 and the second clock signal CLK2 of the embodiment of FIG. 5 so that the power consumption of the display apparatus may be further reduced.

According to an embodiment, all transistors in the gate driver 300 may be configured as the N-type transistors. The gate driver 300 may not include the P-type transistors but include the N-type transistors only.

In an embodiment, the display panel 100 includes the N-type transistors only to prevent the current leakage and the gate driver 300 integrated on the display panel 100 also includes the N-type transistors only such that the manufacturing process may become simplified and the current leakage may be effectively prevented from occurring in the gate driver 300. In such an embodiment, the flicker due to the current leakage may be effectively prevented so that the display quality of the display panel 100 may be enhanced.

In such an embodiment, the reliability and the stability of the gate output signal OUT[n] may be enhanced and the power consumption may be reduced.

Figure 7:
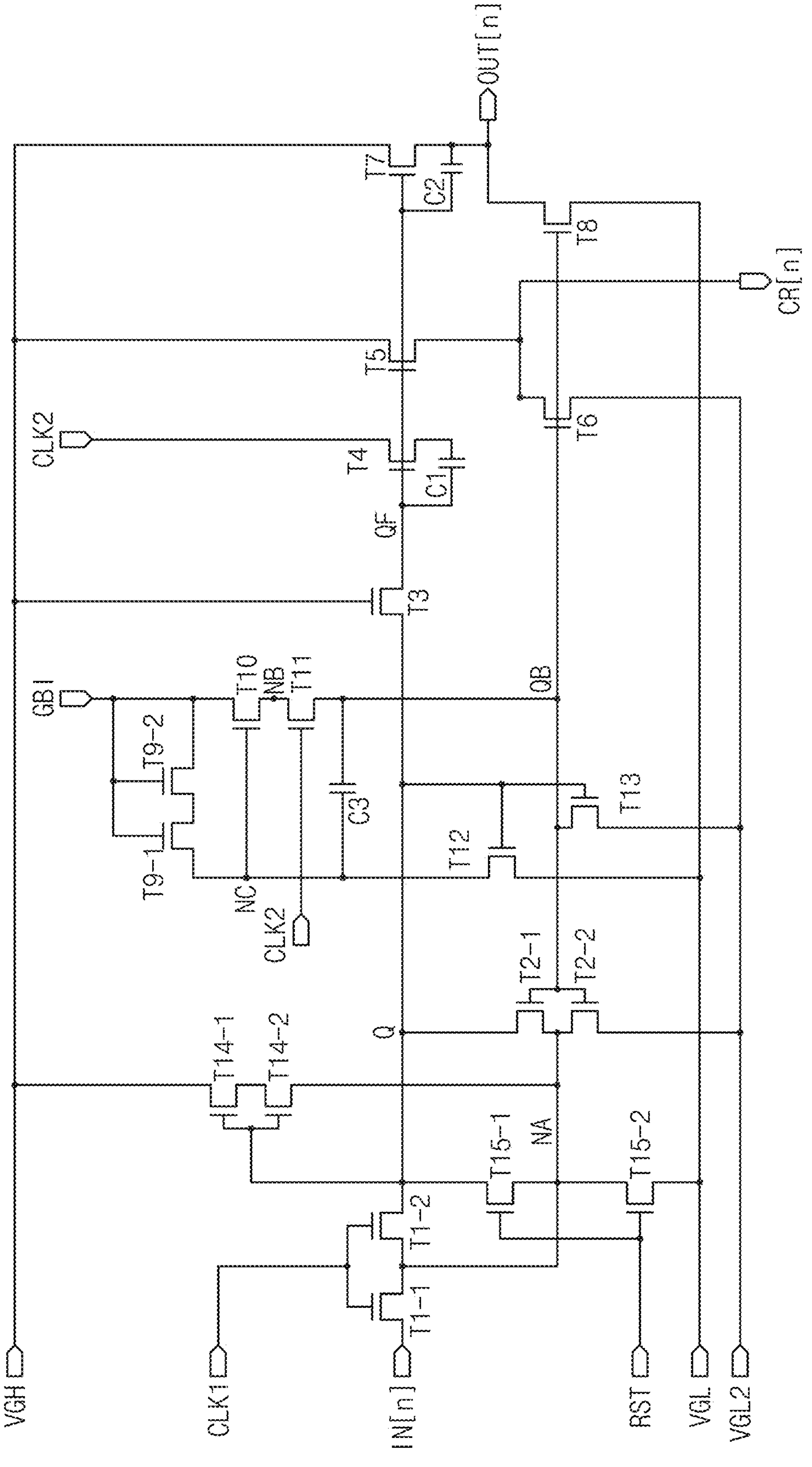
FIG. 7 is a circuit diagram illustrating a stage of a gate driver according to an embodiment of the invention.

FIG. 7 is a circuit diagram illustrating a stage of a gate driver 300 according to an embodiment of the invention.

The embodiment of the stage of the gate driver 300 shown in FIG. 7 is substantially the same as the embodiment of the stage of the gate driver 300 described above with reference to FIG. 3 except for the QB control signal. Thus, the same reference numerals will be used to refer to the same or like parts as those described above with reference to FIGS. 1 to 3 and any repetitive detailed description thereof will be omitted.

Referring to FIG. 7, in an embodiment, the QB control signal GBI may be different from the high voltage VGH. In an embodiment, for example, the QB control signal GBI may have the high voltage VGH in a normal driving operation. The QB control signal GBI may have a voltage different from the high voltage VGH in the initial turning-on period. In such an embodiment, the level of the QB control node GBI may be appropriately adjusted during the initial turning-on period so that an unintentional or undesired light emission of the display panel 100 may be effectively prevented in the initial turning-on period of the display apparatus.

According to an embodiment, all transistors in the gate driver 300 may be configured as the N-type transistors. In such an embodiment, the gate driver 300 may not include the P-type transistors but include the N-type transistors only.

In such an embodiment, to prevent the current leakage, the display panel 100 includes the N-type transistors only and the gate driver 300 integrated on the display panel 100 also includes the N-type transistors only such that the manufacturing process may become simplified and the current leakage may be effectively prevented in the gate driver 300. In such an embodiment, the flicker due to the current leakage may be effectively prevented so that the display quality of the display panel 100 may be enhanced.

In addition, the reliability and the stability of the gate output signal OUT[n] may be enhanced and the power consumption may be reduced.

Figure 8:
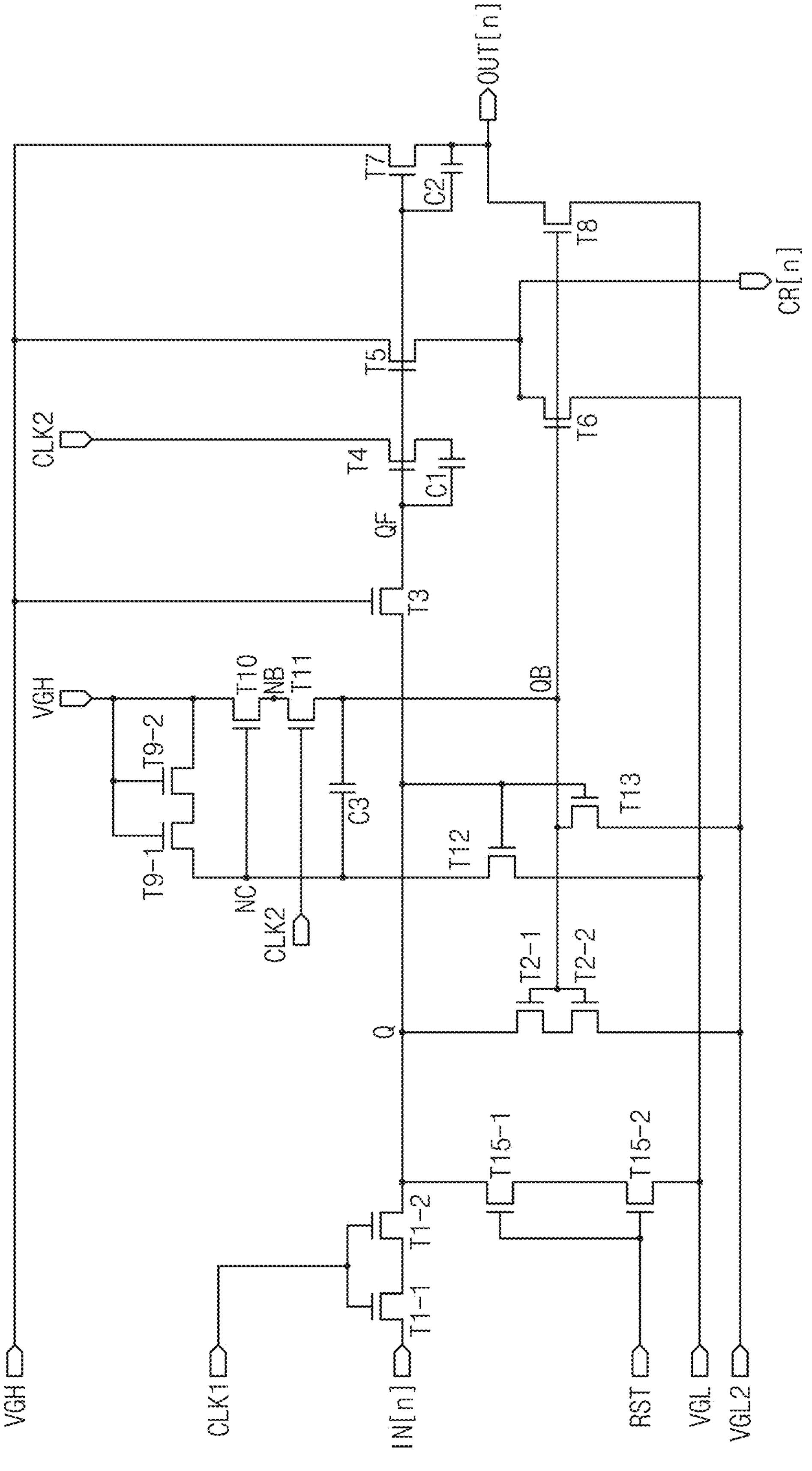
FIG. 8 is a circuit diagram illustrating a stage of a gate driver according to an embodiment of the invention.

FIG. 8 is a circuit diagram illustrating a stage of a gate driver 300 according to an embodiment of the invention.

The embodiment of the stage of the gate driver 300 shown in FIG. 8 is substantially the same as the embodiment of the stage of the gate driver 300 described above with reference to FIG. 3 except that the stage does not include the stabilizing circuit. Thus, the same reference numerals will be used to refer to the same or like parts as those described above with reference to FIGS. 1 to 3 and any repetitive detailed description thereof will be omitted.

Referring to FIG. 8, in an embodiment, the stage may not include the stabilizing circuit T14-1 and T14-2 of FIG. 3.

In an embodiment, the stabilizing circuit T14-1 and T14-2 may be omitted depending on characteristics of the display panel 100, the gate driver 300 and the display apparatus. In such an embodiment where the stage of the gate driver 300 does not include the stabilizing circuit T14-1 and T14-2, an area of the stage of the gate driver 300 may be reduced. Thus, a dead space of the display apparatus may be reduced.

According to an embodiment, all transistors in the gate driver 300 may be configured as the N-type transistors. In such an embodiment, the gate driver 300 may not include the P-type transistors but include the N-type transistors only.

In such an embodiment, to prevent the current leakage, the display panel 100 includes the N-type transistors only and the gate driver 300 integrated on the display panel 100 also includes the N-type transistors only so that the manufacturing process may become simplified and the current leakage may be effectively prevented in the gate driver 300. In such an embodiment, the flicker due to the current leakage may be effectively prevented so that the display quality of the display panel 100 may be enhanced.

In addition, the reliability and the stability of the gate output signal OUT[n] may be enhanced and the power consumption may be reduced.

Figure 9:
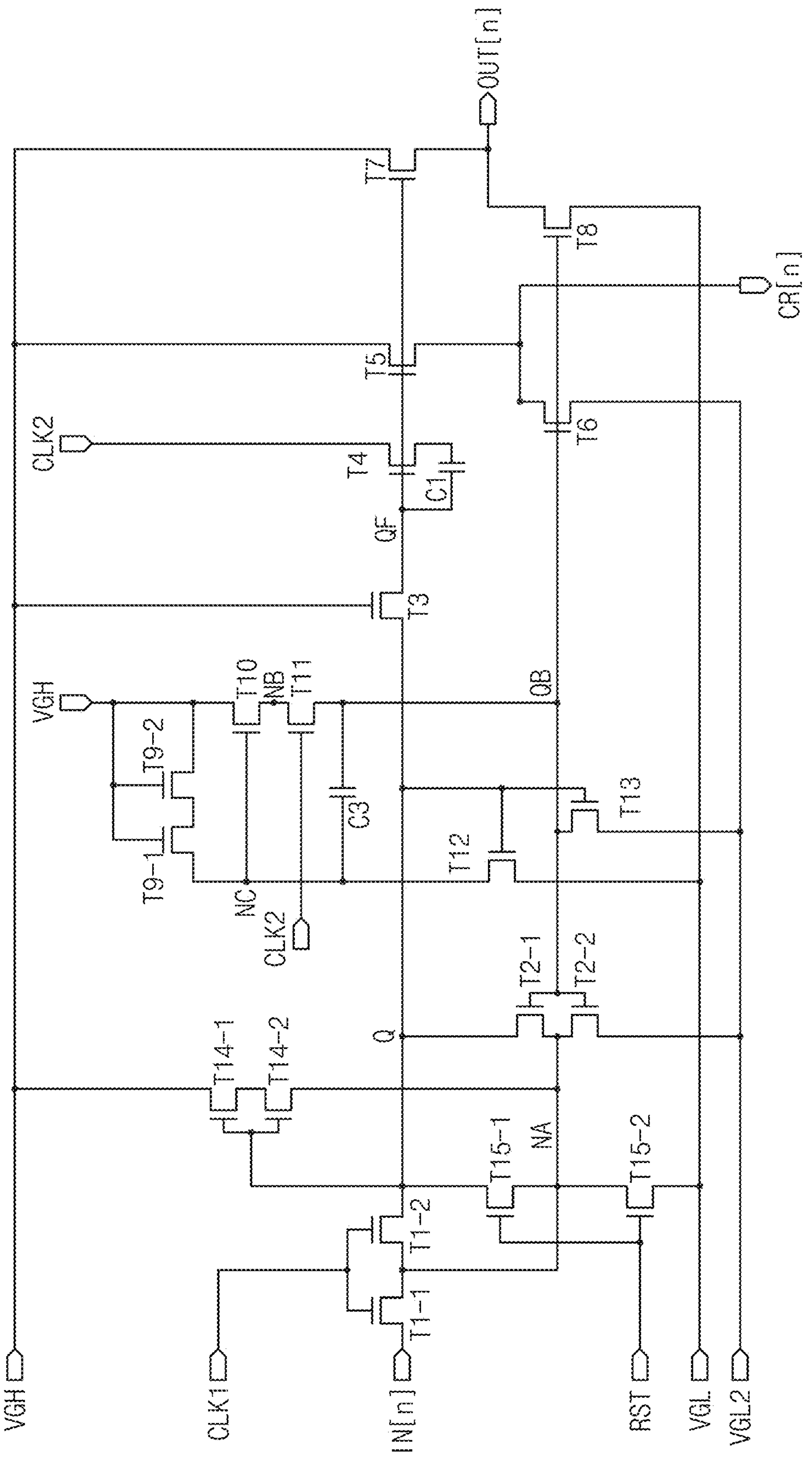
FIG. 9 is a circuit diagram illustrating a stage of a gate driver according to an embodiment of the invention.
Figure 10:
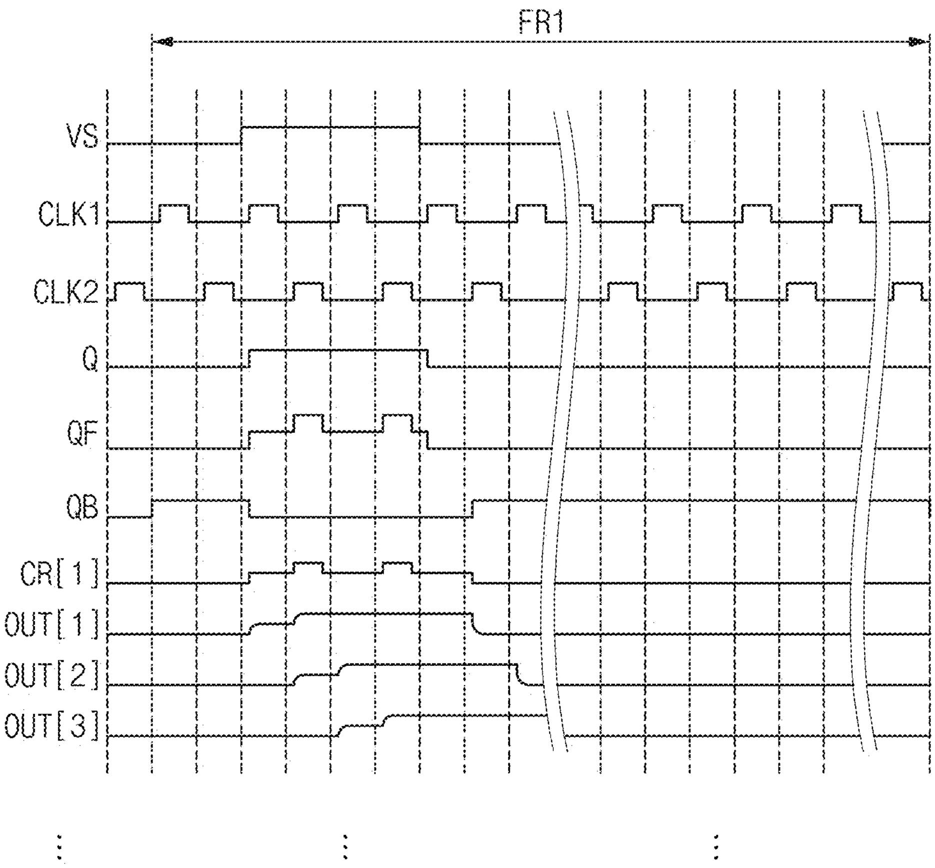
FIG. 10 is a signal timing diagram illustrating input signals, node signals and output signals of the gate driver of FIG. 9.

FIG. 9 is a circuit diagram illustrating a stage of a gate driver 300 according to an embodiment of the invention. FIG. 10 is a signal timing diagram illustrating input signals, node signals and output signals of the gate driver 300 of FIG. 9.

The embodiment of the stage of the gate driver 300 shown in FIG. 9 is substantially the same as the embodiment of the stage of the gate driver 300 described above with reference to FIG. 3 except that the stage does not include the second capacitor C2. Thus, the same reference numerals will be used to refer to the same or like parts as those described above with reference to FIGS. 1 to 3 and any repetitive detailed description thereof will be omitted.

The embodiment of the input signals, the node signals and the output signals of the gate driver 300 shown in FIG. 10 are substantially the same as the embodiment of the input signals, the node signals and the output signals of the gate driver 300 described above FIG. 4 except that the carry signal CR and the gate output signal OUT increase in two steps since the stage does not include the second capacitor C2. Thus, the same reference numerals will be used to refer to the same or like parts as those described above with reference to FIGS. 1 to 3 and any repetitive detailed description thereof will be omitted.

In an embodiment, the second capacitor C2 may be the boosting capacitor which quickly pulls up the gate output signal OUT[n]. The second capacitor C2 may be omitted depending on characteristics of the display panel 100, the gate driver 300 and the display apparatus. In such an embodiment where the stage of the gate driver 300 does not include the second capacitor C2, an area of the stage of the gate driver 300 may be reduced so that a dead space of the display apparatus may be reduced.

In such an embodiment, a voltage level of the signal of the QF node may be slightly less than a voltage level of the signal of the Q node due to a threshold voltage of the third transistor T3. In such an embodiment, the stage does not include the second capacitor C2 so that the fifth transistor T5 and the seventh transistor T7 may not completely turned on when the signal of the Q node has a high level and the signal of the QF node has a first high level. Accordingly, the carry signal CR and the gate output signal OUT may increase to a first step when the signal of the Q node has the high level and the signal of the QF node has the first high level.

Then, when the signal of the QF node is boosted to a second high level in synchronization with a high level of the second clock signal CLK2 by the fourth transistor T4 and the first capacitor C1, the fifth transistor T5 and the seventh transistor T7 may be completely turned on. When the fifth transistor T5 and the seventh transistor T7 are completely turned on, the carry signal CR and the gate output signal OUT may increase to a second step.

According to an embodiment, all transistors in the gate driver 300 may be configured as the N-type transistors. In such an embodiment, the gate driver 300 may not include the P-type transistors but include the N-type transistors only.

In such an embodiment, to prevent the current leakage, the display panel 100 includes the N-type transistors only and the gate driver 300 integrated on the display panel 100 also includes the N-type transistors only so that the manufacturing process may become simplified and the current leakage may be effectively prevented in the gate driver 300. In such an embodiment, the flicker due to the current leakage may be effectively prevented so that the display quality of the display panel 100 may be enhanced.

In addition, the reliability and the stability of the gate output signal OUT[n] may be enhanced and the power consumption may be reduced.

Figure 11:
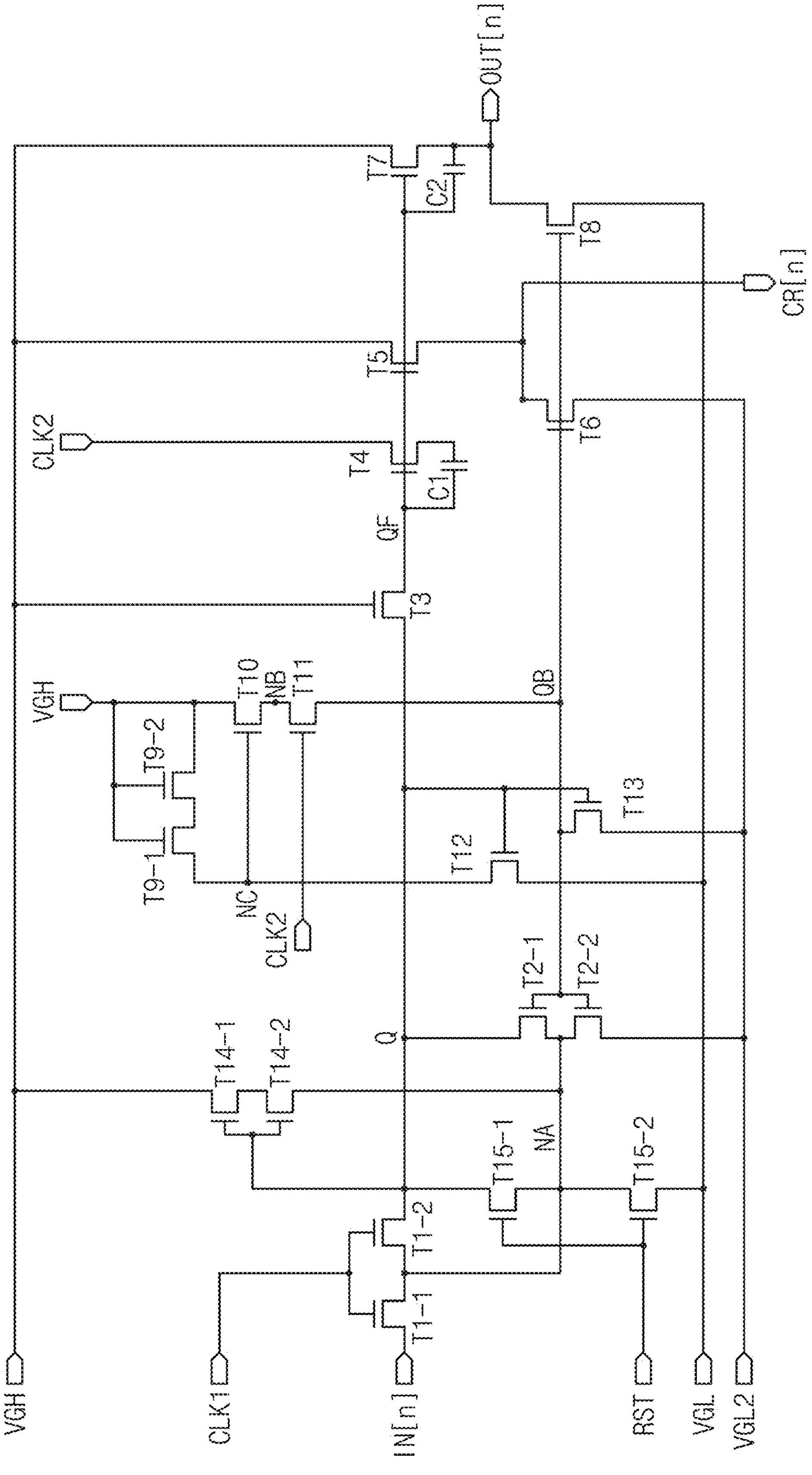
FIG. 11 is a circuit diagram illustrating a stage of a gate driver according to an embodiment of the invention.

FIG. 11 is a circuit diagram illustrating a stage of a gate driver 300 according to an embodiment of the invention.

The embodiment of the stage of the gate driver 300 shown in FIG. 11 is substantially the same as the embodiment of the stage of the gate driver 300 described above with reference to FIG. 3 except that the stage does not include the third capacitor C3. Thus, the same reference numerals will be used to refer to the same or like parts as those described above with reference to FIGS. 1 to 3 and any repetitive detailed description thereof will be omitted.

In an embodiment, the third capacitor C3 may speed up turn-on and turn-off of the tenth transistor T10 to enable a high-speed driving of the display apparatus. The third capacitor C3 may be omitted depending on characteristics of the display panel 100, the gate driver 300 and the display apparatus. In such an embodiment where the stage of the gate driver 300 does not include the third capacitor C3, an area of the stage of the gate driver 300 may be reduced so that a dead space of the display apparatus may be reduced.

According to an embodiment, all transistors in the gate driver 300 may be configured as the N-type transistors. In such an embodiment, the gate driver 300 may not include the P-type transistors but include the N-type transistors only.

In such an embodiment, to prevent the current leakage, the display panel 100 includes the N-type transistors only and the gate driver 300 integrated on the display panel 100 also includes the N-type transistors only so that the manufacturing process may become simplified and the current leakage may be effectively prevented in the gate driver 300. In such an embodiment, the flicker due to the current leakage may be effectively prevented so that the display quality of the display panel 100 may be enhanced.

In addition, the reliability and the stability of the gate output signal OUT[n] may be enhanced and the power consumption may be reduced.

Figure 12:
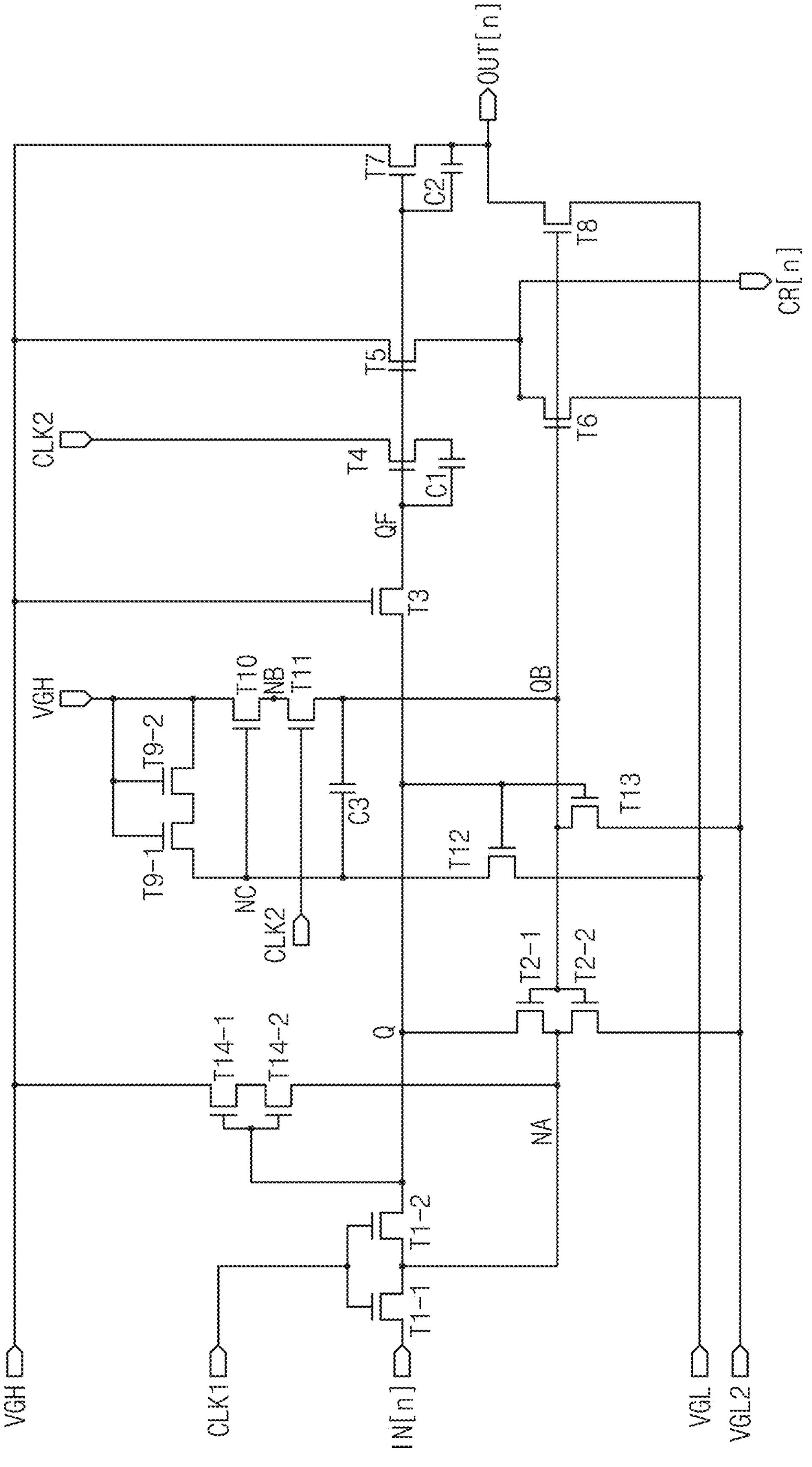
FIG. 12 is a circuit diagram illustrating a stage of a gate driver according to an embodiment of the invention.

FIG. 12 is a circuit diagram illustrating a stage of a gate driver 300 according to an embodiment of the invention.

The embodiment of the stage of the gate driver 300 shown in FIG. 12 is substantially the same as the embodiment of the stage of the gate driver 300 described above with reference to FIG. 3 except that the stage does not include the reset circuit T15-1 and T15-2. Thus, the same reference numerals will be used to refer to the same or like parts as those described above with reference to FIGS. 1 to 3 and any repetitive detailed description thereof will be omitted.

Referring to FIG. 12, in an embodiment, the stage may not include the reset circuit T15-1 and T15-2 of FIG. 3.

In an embodiment, the reset circuit T15-1 and T15-2 may be omitted depending on characteristics of the display panel 100, the gate driver 300 and the display apparatus. In such an embodiment where the stage of the gate driver 300 does not include the reset circuit T15-1 and T15-2, an area of the stage of the gate driver 300 may be reduced so that a dead space of the display apparatus may be reduced.

According to an embodiment, all transistors in the gate driver 300 may be configured as the N-type transistors. In such an embodiment, the gate driver 300 may not include the P-type transistors but include the N-type transistors only.

In such an embodiment, to prevent the current leakage, the display panel 100 includes the N-type transistors only and the gate driver 300 integrated on the display panel 100 also includes the N-type transistors only so that the manufacturing process may become simplified and the current leakage may be effectively prevented in the gate driver 300. In such an embodiment, the flicker due to the current leakage may be effectively prevented so that the display quality of the display panel 100 may be enhanced.

In addition, the reliability and the stability of the gate output signal OUT[n] may be enhanced and the power consumption may be reduced.

Figure 13:
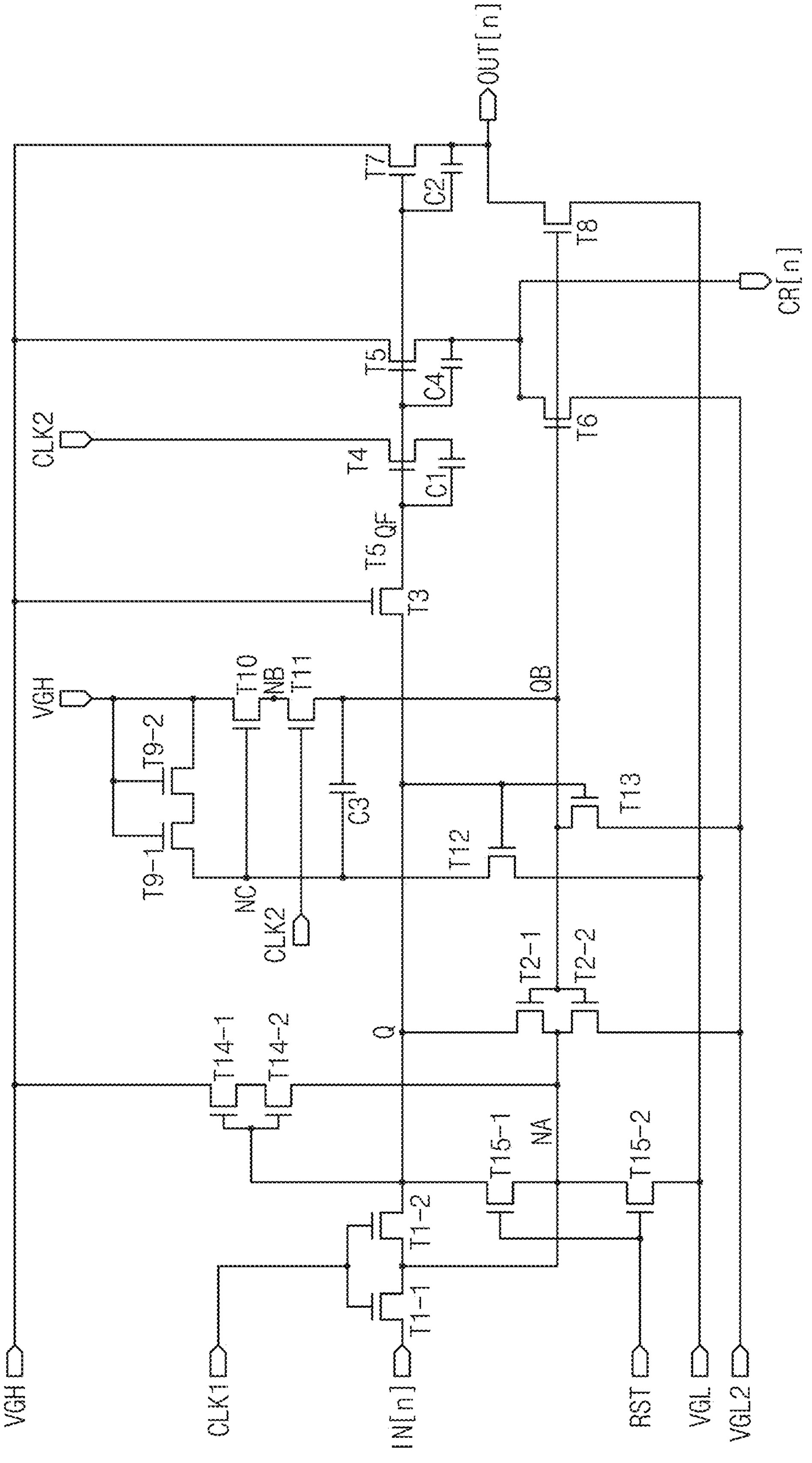
FIG. 13 is a circuit diagram illustrating a stage of a gate driver according to an embodiment of the invention.

FIG. 13 is a circuit diagram illustrating a stage of a gate driver 300 according to an embodiment of the invention.

The embodiment of the stage of the gate driver 300 shown in FIG. 13 is substantially the same as the embodiment of the stage of the gate driver 300 described above with reference to FIG. 3 except that the stage further includes a fourth capacitor C4 connected to the control electrode of the fifth transistor T5 and the second electrode of the fifth transistor T5. Thus, the same reference numerals will be used to refer to the same or like parts as those described above with reference to FIGS. 1 to 3 and any repetitive detailed description thereof will be omitted.

Referring to FIG. 13, in an embodiment, the fourth capacitor C4 may speed up the pulling-up of the carry signal CR[n].

According to an embodiment, all transistors in the gate driver 300 may be configured as the N-type transistors. In such an embodiment, the gate driver 300 may not include the P-type transistors but include the N-type transistors only.

In such an embodiment, to prevent the current leakage, the display panel 100 includes the N-type transistors only and the gate driver 300 integrated on the display panel 100 also includes the N-type transistors only so that the manufacturing process may become simplified and the current leakage may be effectively prevented in the gate driver 300. In such an embodiment, the flicker due to the current leakage may be effectively prevented so that the display quality of the display panel 100 may be enhanced.

In addition, the reliability and the stability of the gate output signal OUT[n] may be enhanced and the power consumption may be reduced.

Figure 14:
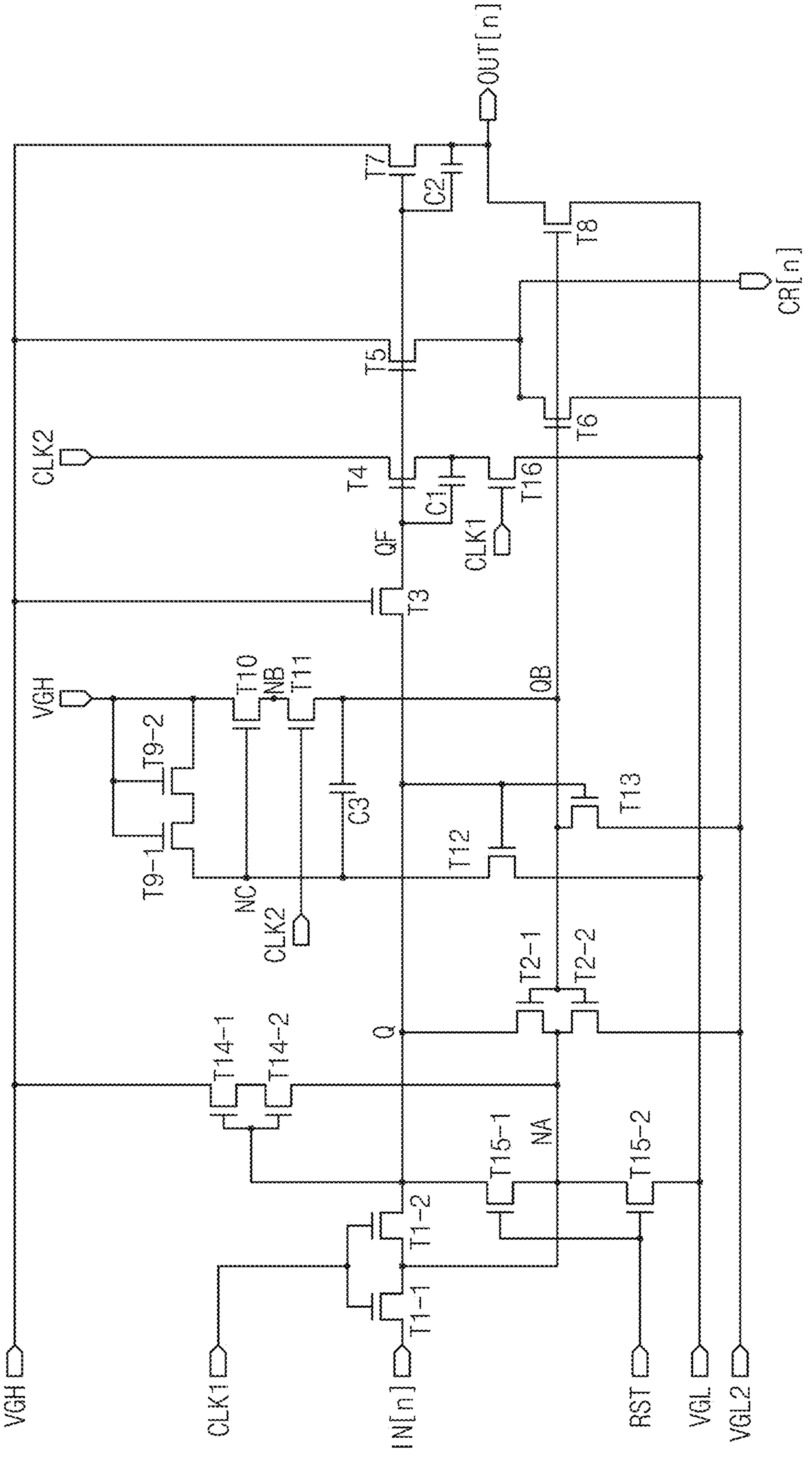
FIG. 14 is a circuit diagram illustrating a stage of a gate driver according to an embodiment of the invention.

FIG. 14 is a circuit diagram illustrating a stage of a gate driver 300 according to an embodiment of the invention.

The embodiment of the stage of the gate driver 300 shown in FIG. 14 is substantially the same as the embodiment of the stage of the gate driver 300 described above with reference to FIG. 3 except that the stage further includes a sixteenth transistor T16 connected to the second electrode of the first capacitor C1. Thus, the same reference numerals will be used to refer to the same or like parts as those described above with reference to FIGS. 1 to 3 and any repetitive detailed description thereof will be omitted.

Referring to FIG. 14, in an embodiment, the sixteenth transistor T16 may apply the low voltage VGL to the second electrode of the fourth transistor T4 in response to the first clock signal CLK1. The sixteenth transistor T16 may initialize the second electrode of the first capacitor C1 in response to the first clock signal CLK1.

According to an embodiment, all transistors in the gate driver 300 may be configured as the N-type transistors. In such an embodiment, the gate driver 300 may not include the P-type transistors but include the N-type transistors only.

In such an embodiment, to prevent the current leakage, the display panel 100 includes the N-type transistors only and the gate driver 300 integrated on the display panel 100 also includes the N-type transistors only so that the manufacturing process may become simplified and the current leakage may be effectively prevented in the gate driver 300. In such an embodiment, the flicker due to the current leakage may be effectively prevented so that the display quality of the display panel 100 may be enhanced.

In addition, the reliability and the stability of the gate output signal OUT[n] may be enhanced and the power consumption may be reduced.

Figure 15:
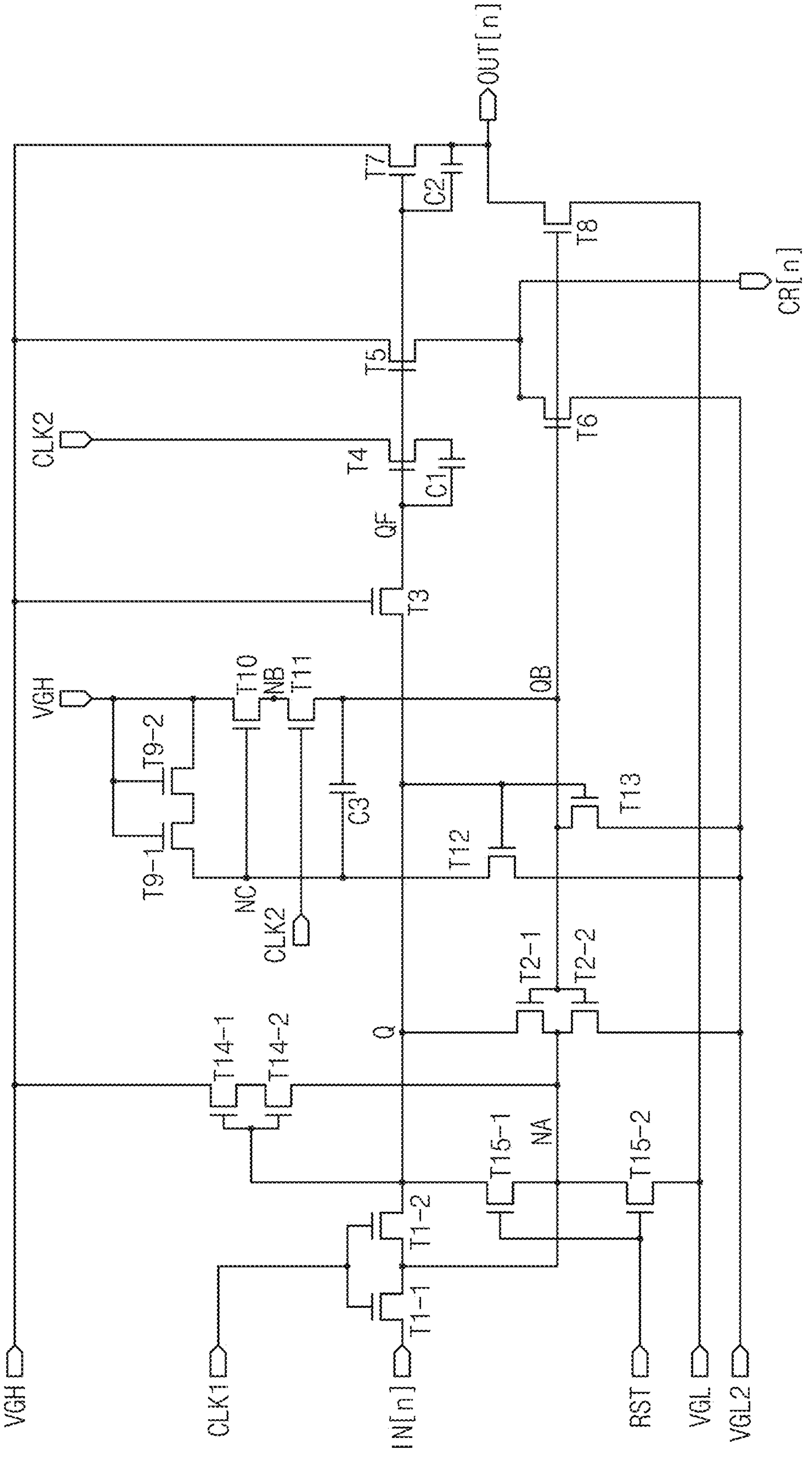
FIG. 15 is a circuit diagram illustrating a stage of a gate driver according to an embodiment of the invention.

FIG. 15 is a circuit diagram illustrating a stage of a gate driver 300 according to an embodiment of the invention.

The embodiment of the stage of the gate driver 300 shown in FIG. 15 is substantially the same as the embodiment of the stage of the gate driver 300 described above with reference to FIG. 3 except for the voltage applied to the first electrode of the twelfth transistor T12. Thus, the same reference numerals will be used to refer to the same or like parts as those described above with reference to FIGS. 1 to 3 and any repetitive explanation concerning the above elements will be omitted.

Referring to FIG. 15, in an embodiment, the stage of the gate driver 300 may include the twelfth transistor T12 that applies the second low voltage VGL2 to the control electrode of the tenth transistor T10 in response to the signal of the Q node.

According to an embodiment, all transistors in the gate driver 300 may be configured as the N-type transistors. In such an embodiment, the gate driver 300 may not include the P-type transistors but include the N-type transistors only.

In such an embodiment, to prevent the current leakage, the display panel 100 includes the N-type transistors only and the gate driver 300 integrated on the display panel 100 also includes the N-type transistors only so that the manufacturing process may become simplified and the current leakage may be effectively prevented in the gate driver 300. In such an embodiment, the flicker due to the current leakage may be effectively prevented so that the display quality of the display panel 100 may be enhanced.

In addition, the reliability and the stability of the gate output signal OUT[n] may be enhanced and the power consumption may be reduced.

Figure 16:
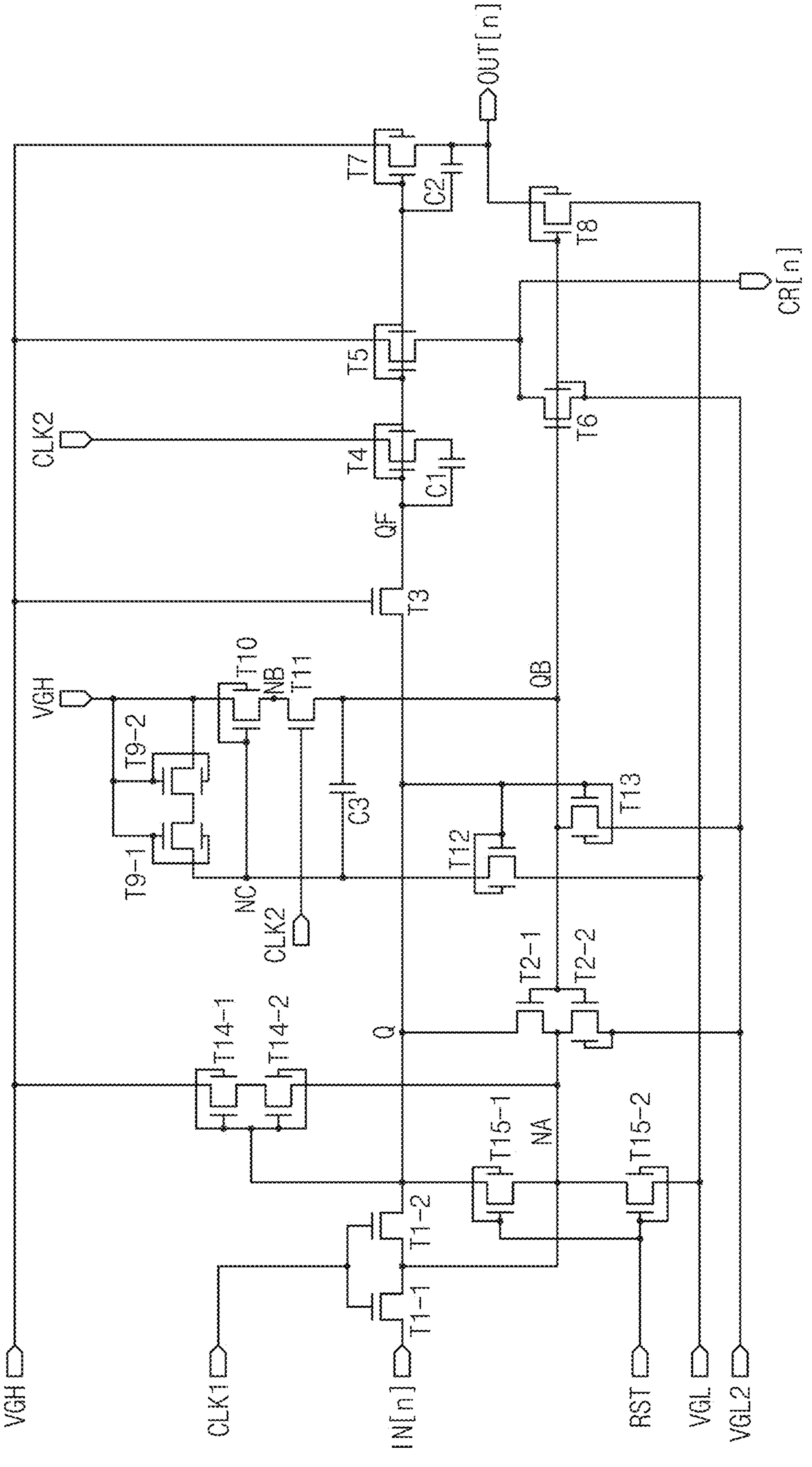
FIG. 16 is a circuit diagram illustrating a stage of a gate driver according to an embodiment of the invention.

FIG. 16 is a circuit diagram illustrating a stage of a gate driver 300 according to an embodiment of the invention.

The embodiment of the stage of the gate driver 300 shown in FIG. 16 is substantially the same as the embodiment of the stage of the gate driver 300 described above with reference to FIG. 3 except that some of the transistors in the stage of the gate driver 300 further include a second control electrode. Thus, the same reference numerals will be used to refer to the same or like parts as those described above with reference to FIGS. 1 to 3 and any repetitive detailed description thereof will be omitted.

Referring to FIG. 16, in an embodiment, the second second transistor T2-2 may further include a second control electrode. The second low voltage VGL2 may be applied to the second control electrode of the second second transistor T2-2. The second low voltage VGL2 is applied to the second control electrode of the second second transistor T2-2 so that a threshold voltage of the second second transistor T2-2 may be shifted in a positive direction, and accordingly, a current leakage of the second second transistor T2-2 may be reduced. In addition, when the second low voltage VGL2 is applied to the second control electrode of the second second transistor T2-2, a turned-off characteristic of the second second transistor T2-2 may be enhanced.

In an embodiment, the fourth transistor T4 may further include a second control electrode. The second control electrode of the fourth transistor T4 may be connected to the control electrode of the fourth transistor T4.

In an embodiment, the fifth transistor T5 may further include a second control electrode. The second control electrode of the fifth transistor T5 may be connected to the control electrode of the fifth transistor T5.

In an embodiment, the sixth transistor T6 may further include a second control electrode. The second low voltage VGL2 may be applied to the second control electrode of the sixth transistor T6.

In an embodiment, the seventh transistor T7 may further include a second control electrode. The second control electrode of the seventh transistor T7 may be connected to the control electrode of the seventh transistor T7.

In an embodiment, the eighth transistor T8 may further include a second control electrode. The second control electrode of the eighth transistor T8 may be connected to the control electrode of the eighth transistor T8.

In an embodiment, the first ninth transistor T9-1 may further include a second control electrode. The second control electrode of the first ninth transistor T9-1 may be connected to the control electrode of the first ninth transistor T9-1.

In an embodiment, the second ninth transistor T9-2 may further include a second control electrode. The second control electrode of the second ninth transistor T9-2 may be connected to the control electrode of the second ninth transistor T9-2.

In an embodiment, the tenth transistor T10 may further include a second control electrode. The second control electrode of the tenth transistor T10 may be connected to the control electrode of the tenth transistor T10.

In an embodiment, the twelfth transistor T12 may further include a second control electrode. The second control electrode of the twelfth transistor T12 may be connected to the control electrode of the twelfth transistor T12.

In an embodiment, the thirteenth transistor T13 may further include a second control electrode. The second control electrode of the thirteenth transistor T13 may be connected to the control electrode of the thirteenth transistor T13.

In an embodiment, the first fourteenth transistor T14-1 may further include a second control electrode. The second control electrode of the first fourteenth transistor T14-1 may be connected to the control electrode of the first fourteenth transistor T14-1.

In an embodiment, the second fourteenth transistor T14-2 may further include a second control electrode. The second control electrode of the second fourteenth transistor T14-2 may be connected to the control electrode of the second fourteenth transistor T14-2.

In an embodiment, the first fifteenth transistor T15-1 may further include a second control electrode. The second control electrode of the first fifteenth transistor T15-1 may be connected to the control electrode of the first fifteenth transistor T15-1.

In an embodiment, the second fifteenth transistor T15-2 may further include a second control electrode. The second control electrode of the second fifteenth transistor T15-2 may be connected to the control electrode of the second fifteenth transistor T15-2.

In an embodiment, as shown in FIG. 3, all of the transistors in the stage of the gate driver 300 may be three-terminal elements. In another embodiment, as shown in FIG. 16, some of the transistors in the stage of the gate driver 300 are four-terminal elements. In such an embodiment where the transistor is configured as the four-terminal element, a second control electrode of the four-terminal element may be connected to a control electrode of the four-terminal element. Alternatively, in an embodiment where the transistor is configured as the four-terminal element, a second control electrode of the four-terminal element may be connected to a first electrode or a second electrode of the four-terminal element. In an embodiment, for example, the low voltage VGL may be applied to the second control electrode of the four-terminal element. In an embodiment, for example, the second low voltage VGL2 may be applied to the second control electrode of the four-terminal element.

According to an embodiment, all transistors in the gate driver 300 may be configured as the N-type transistors. In such an embodiment, the gate driver 300 may not include the P-type transistors but include the N-type transistors only.

In such an embodiment, to prevent the current leakage, the display panel 100 includes the N-type transistors only and the gate driver 300 integrated on the display panel 100 also includes the N-type transistors only so that the manufacturing process may become simplified and the current leakage may be effectively prevented in the gate driver 300. In such an embodiment, the flicker due to the current leakage may be effectively prevented so that the display quality of the display panel 100 may be enhanced.

In addition, the reliability and the stability of the gate output signal OUT[n] may be enhanced and the power consumption may be reduced.

Figure 17:
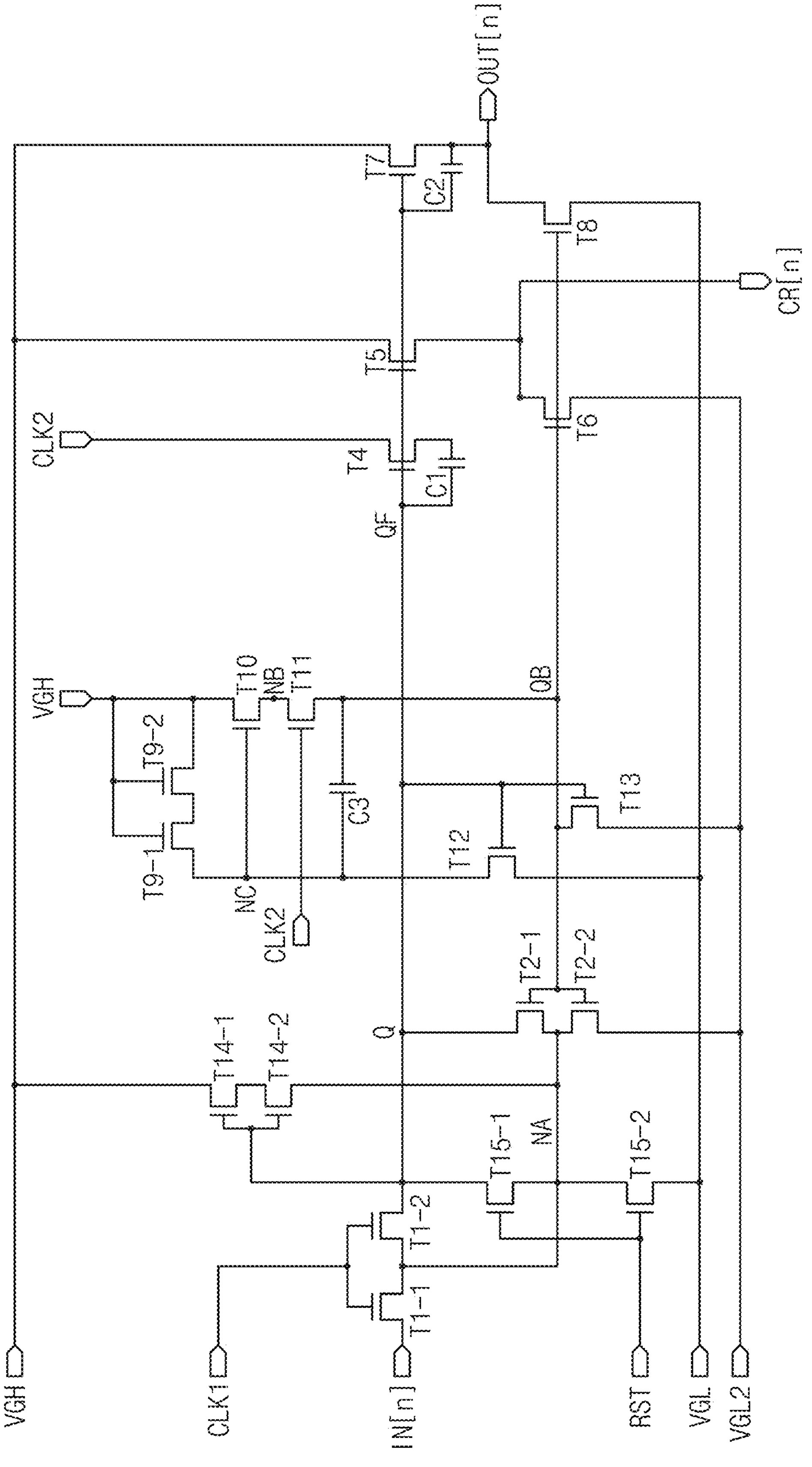
FIG. 17 is a circuit diagram illustrating a stage of a gate driver according to an embodiment of the invention.

FIG. 17 is a circuit diagram illustrating a stage of a gate driver 300 according to an embodiment of the invention.

The embodiment of the stage of the gate driver 300 shown in FIG. 17 is substantially the same as the embodiment of the stage of the gate driver 300 described above with reference to FIG. 3 except that the stage of the gate driver 300 does not include the third transistor T3. Thus, the same reference numerals will be used to refer to the same or like parts as those described above with reference to FIGS. 1 to 3 and any repetitive detailed description thereof will be omitted.

In an embodiment, the high voltage VGH is constantly applied to the control electrode of the third transistor T3 of FIG. 3 so that a threshold voltage of the third transistor T3 of FIG. 3 may be positively shifted and accordingly, the third transistor T3 of FIG. 3 may not normally operate. Thus, in such an embodiment, the third transistor T3 may be removed to enhance a reliability of the gate driver 300. Therefore, in such an embodiment, the Q node may be same as the QF node. In such an embodiment, the capacitance of the second capacitor C2 may be desired to be sufficiently large for the reliability of the gate driver 300.

According to an embodiment, all transistors in the gate driver 300 may be configured as the N-type transistors. In such an embodiment, the gate driver 300 may not include the P-type transistors but include the N-type transistors only.

In such an embodiment, to prevent the current leakage, the display panel 100 includes the N-type transistors only and the gate driver 300 integrated on the display panel 100 also includes the N-type transistors only so that the manufacturing process may become simplified and the current leakage may be effectively prevented in the gate driver 300. In such an embodiment, the flicker due to the current leakage may be effectively prevented so that the display quality of the display panel 100 may be enhanced.

In addition, the reliability and the stability of the gate output signal OUT[n] may be enhanced and the power consumption may be reduced.

Figure 18:
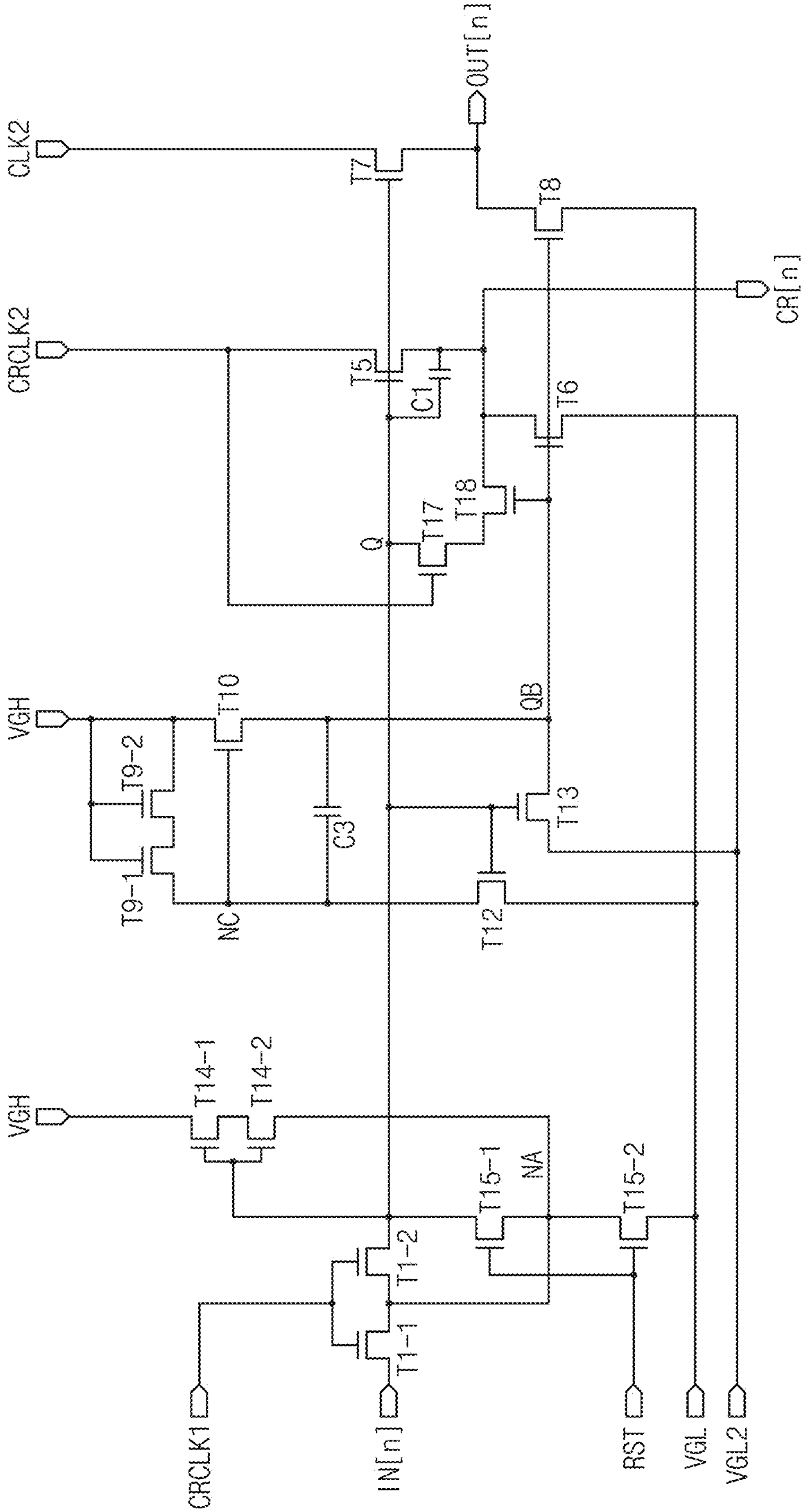
FIG. 18 is a circuit diagram illustrating a stage of a gate driver according to an embodiment of the invention.
Figure 19:
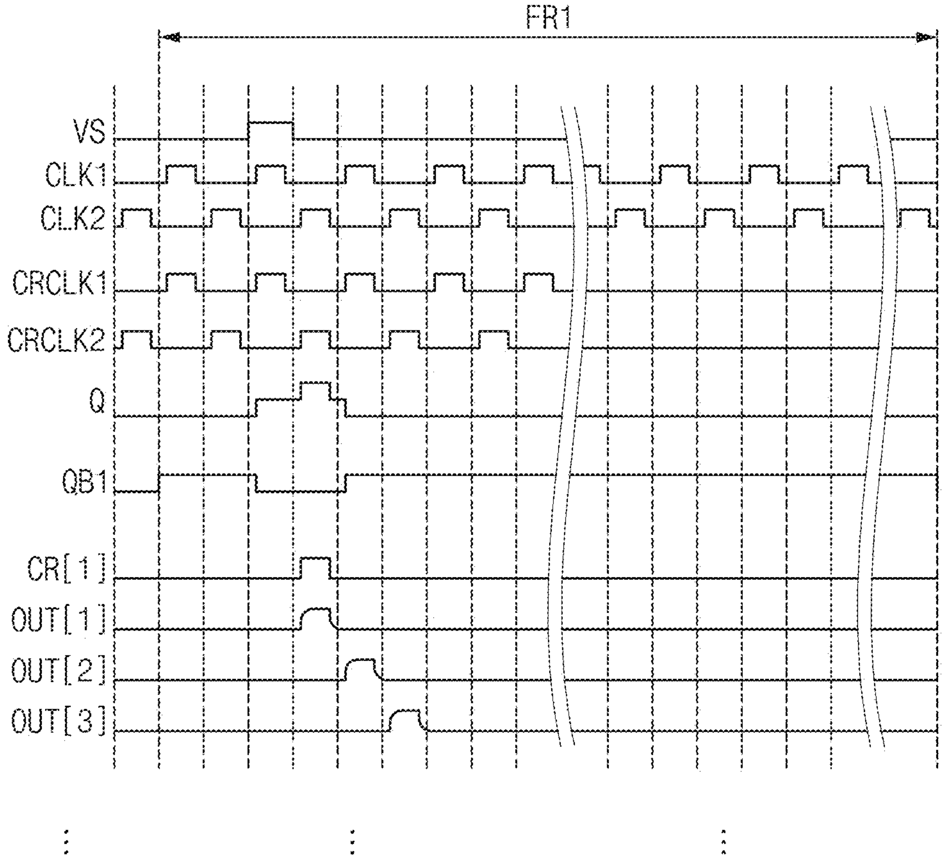
FIG. 19 is a signal timing diagram illustrating input signals, node signals and output signals of the gate driver of FIG. 18.

FIG. 18 is a circuit diagram illustrating a stage of a gate driver according to an embodiment of the invention. FIG. 19 is a signal timing diagram illustrating input signals, node signals and output signals of the gate driver of FIG. 18.

Referring to FIGS. 1, 2, 18 and 19, an embodiment of the stage of the gate driver 300 includes a pull-up circuit that outputs a second clock signal CLK2 as a gate output signal OUT[n] in response to a signal of a Q node, a pull-down circuit that pulls down the gate output signal OUT[n] to a low voltage VGL in response to a signal of a QB node, and a QB node control circuit that controls the signal of the QB node based on a QB control signal (e.g. VGH). In such an embodiment, the QB control signal may be the high voltage VGH.

In an embodiment, for example, the pull-up circuit may include a seventh transistor T7 including a control electrode connected to the Q node, a first electrode that receives the second clock signal CLK2 and a second electrode connected to a gate output terminal.

In an embodiment, for example, the pull-down circuit may include an eighth transistor T8.

The QB node control circuit may include a first ninth transistor T9-1 including a control electrode that receives the QB control signal (e.g. VGH), a first electrode connected to a control electrode NC of a tenth transistor T10, a second ninth transistor T9-2 including a control electrode that receives the QB control signal (e.g. VGH), a first electrode connected to a ninth intermediate node and a second electrode that receives the QB control signal (e.g. VGH) and the tenth transistor T10 including a control electrode connected to the first electrode of the first ninth transistor T9-1, a first electrode that receives the QB control signal (e.g. VGH) and a second electrode connected to the QB node.

The QB node control circuit may further include a third capacitor C3 including a first electrode connected to the control electrode of the tenth transistor T10 and a second electrode connected to the QB node.

The third capacitor C3 may accelerate the turn-on and the turn-off of the tenth transistor T10 so that the display apparatus may operate quickly.

In such an embodiment, the stage of the gate driver 300 may further include a twelfth transistor T12 that applies the low voltage VGL to the control electrode of the tenth transistor T10 in response to the signal of the Q node.

When the signal of the Q node has a high level, the twelfth transistor T12 may be turned on, the low voltage VGL may be applied to the control electrode of the tenth transistor T10 by the twelfth transistor T12. When the low voltage VGL is applied to the control electrode of the tenth transistor T10, the tenth transistor T10 may be turned off. There is a period when both of the signal of the Q node and the QB control signal (e.g. VGH) have high levels. In the period when both of the signal of the Q node and the QB control signal (e.g.

VGH) have high levels, the first ninth transistor T9-1, the second ninth transistor T9-2 and the twelfth transistor T12 may be turned on. When the first ninth transistor T9-1, the second ninth transistor T9-2 and the twelfth transistor T12 are turned on, a voltage drop may occur due to resistance components of the first ninth transistor T9-1 and the second ninth transistor T9-2 so that the signal of the control electrode of the tenth transistor T10 may maintain a level of the low voltage VGL. Thus, even though both of the signal of the Q node and the QB control signal (e.g. VGH) have high levels, the tenth transistor T10 may maintain a turned-off state well. Herein, the first ninth transistor T9-1 and the second ninth transistor T9-2 may function as an inverter including a diode connection.

In an embodiment, the stage of the gate driver 300 may further include a carry pull-up circuit that outputs a second carry clock signal CRCLK2 as a carry signal CR[n] in response to the signal of the Q node and a carry pull-down circuit that pulls down the carry signal CR[n] to a second low voltage VGL2.

The carry pull-up circuit may include a fifth transistor T5 including a control electrode connected to the Q node, a first electrode that receives the second carry clock signal CRCLK2 and a second electrode connected to a carry output terminal.

The carry pull-up circuit may further include a first capacitor C1 including a first electrode connected to the Q node and a second electrode connected to the carry output terminal.

The carry pull-down circuit may include a sixth transistor T6 including a control electrode connected to the QB node, a first electrode that receives the second low voltage VGL2 and a second electrode connected to the carry output terminal.

In an embodiment, the stage of the gate driver 300 may further include an input circuit that transmits an input signal IN[n] to the Q node in response to a first carry clock signal CRCLK1

The input circuit may include a first first transistor T1-1 including a control electrode that receives the first carry clock signal CRCLK1, a first electrode that receives the input signal IN[n] and a second electrode connected to a first intermediate node and a second first transistor T1-2 including a control electrode that receives the first carry clock signal CRCLK1, a first electrode connected to the first intermediate node and a second electrode connected to the Q node.

In an embodiment, the stage of the gate driver 300 may further include a Q node control circuit that controls the signal of the Q node based on the signal of the QB node and the second carry clock signal CRCLK2.

The Q node control circuit may include a seventeenth transistor T17 including a control electrode that receives the second carry clock signal CRCLK2, a first electrode connected to the Q node and a second electrode connected to a seventeenth intermediate node and an eighteenth transistor T18 including a control electrode connected to the QB node, a first electrode connected to the seventeenth intermediate node and a second electrode connected to the carry output terminal.

In an embodiment, the stage of the gate driver 300 may further include a thirteenth transistor T13 that applies the second low voltage VGL2 to the QB node in response to the signal of the Q node.

In an embodiment, the stage of the gate driver 300 may further include a reset circuit that applies the low voltage VGL to the Q node in response to the reset signal RST.

The reset circuit may include a second fifteenth transistor T15-2 including a control electrode that receives the reset signal RST, a first electrode that receives the low voltage VGL and a second electrode connected to a fifteenth intermediate node and a first fifteenth transistor T15-1 including a control electrode that receives the reset signal RST, a first electrode connected to the fifteenth intermediate node and a second electrode connected to the Q node.

The reset signal RST may have an active level in an initial turning-on period of the display apparatus. In such an embodiment, an unintentional or undesired light emission may be effectively prevented in the initial turning-on period of the display apparatus by the reset signal RST.

In an embodiment, the stage of the gate driver 300 may further include a stabilizing circuit applying the high voltage VGH to the first intermediate node NA in response to the signal of the Q node. The stabilizing circuit may also apply the high voltage VGH to the fifteenth intermediate node NA.

The stabilizing circuit may include a second fourteenth transistor T14-2 including a control electrode connected to the Q node, a first electrode connected to a fourteenth intermediate node and a second electrode connected to the first intermediate node and the fifteenth intermediate node and a first fourteenth transistor T14-1 including a control electrode connected to the Q node, a first electrode that receives the high voltage VGH and a second electrode connected to the fourteenth intermediate node.

According to an embodiment, all transistors in the gate driver 300 may be configured as the N-type transistors. In such an embodiment, the gate driver 300 may not include the P-type transistors but include the N-type transistors only.

In such an embodiment, to prevent the current leakage, the display panel 100 includes the N-type transistors only and the gate driver 300 integrated on the display panel 100 also includes the N-type transistors only so that the manufacturing process may become simplified and the current leakage may be effectively prevented in the gate driver 300. In such an embodiment, the flicker due to the current leakage may be effectively prevented so that the display quality of the display panel 100 may be enhanced.

In addition, the reliability and the stability of the gate output signal OUT[n] may be enhanced and the power consumption may be reduced.

Figure 20:
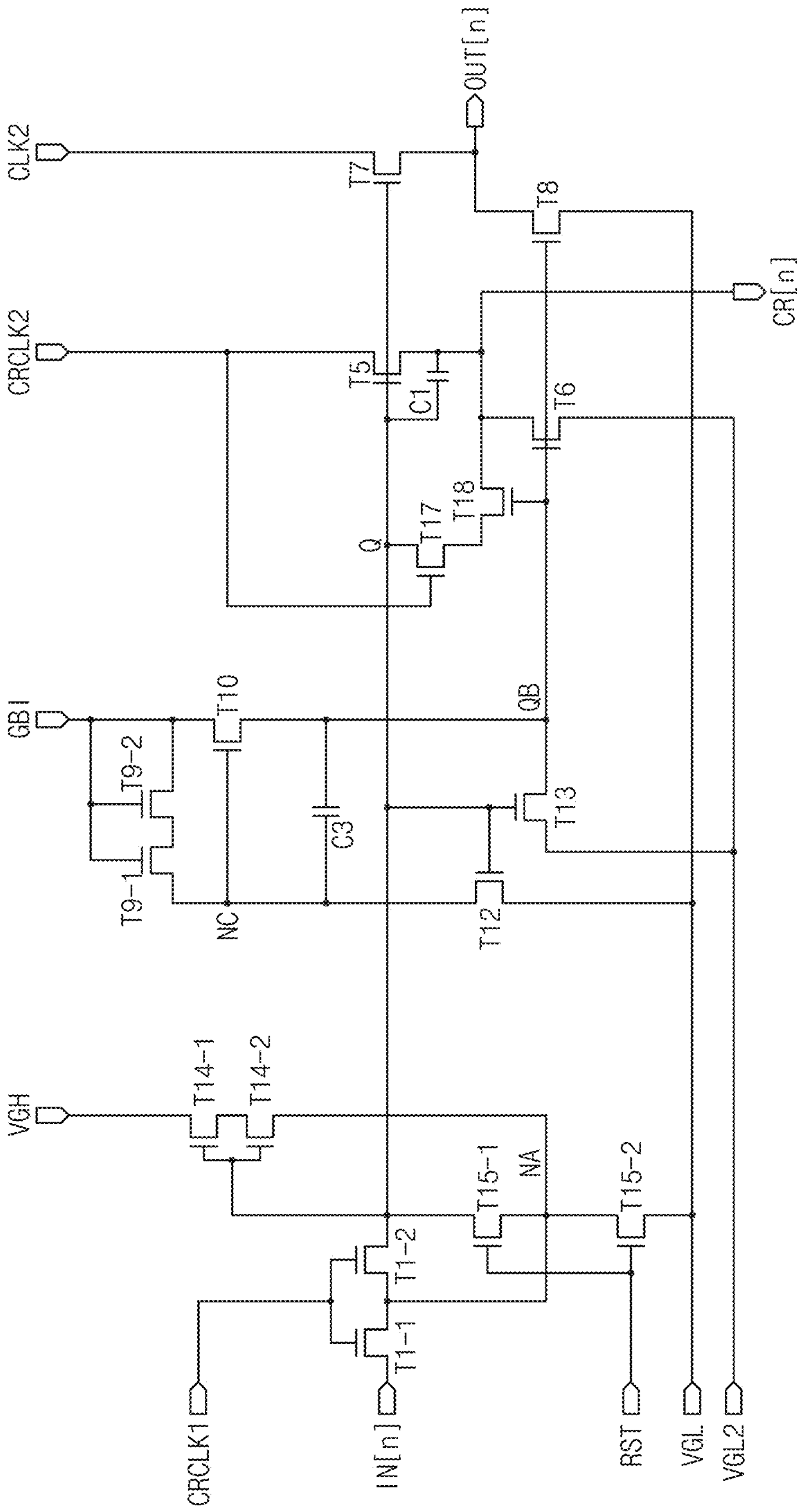
FIG. 20 is a circuit diagram illustrating a stage of a gate driver according to an embodiment of the invention.

FIG. 20 is a circuit diagram illustrating a stage of a gate driver 300 according to an embodiment of the invention.

The embodiment of the stage of the gate driver 300 shown in FIG. 20 is substantially the same as the embodiment of the stage of the gate driver 300 described above with reference to FIG. 18 except for the QB control signal. Thus, the same reference numerals will be used to refer to the same or like parts as those described above with reference to FIGS. 18 and 19 and any repetitive detailed description thereof will be omitted.

Referring to FIG. 20, in an embodiment, the QB control signal GBI may be different from the high voltage VGH. In an embodiment, for example, the QB control signal GBI may have the high voltage VGH in a normal driving operation. The QB control signal GBI may have a voltage different from the high voltage VGH in the initial turning-on period. In such an embodiment, the level of the QB control node GBI may be appropriately adjusted during the initial turning-on period so that an unintentional or undesired light emission of the display panel 100 may be effectively prevented in the initial turning-on period of the display apparatus.

According to an embodiment, all transistors in the gate driver 300 may be configured as the N-type transistors. In such an embodiment, the gate driver 300 may not include the P-type transistors but include the N-type transistors only.

In such an embodiment, to prevent the current leakage, the display panel 100 includes the N-type transistors only and the gate driver 300 integrated on the display panel 100 also includes the N-type transistors only so that the manufacturing process may become simplified and the current leakage may be effectively prevented in the gate driver 300. In such an embodiment, the flicker due to the current leakage may be effectively prevented so that the display quality of the display panel 100 may be enhanced.

In addition, the reliability and the stability of the gate output signal OUT[n] may be enhanced and the power consumption may be reduced.

Figure 21:
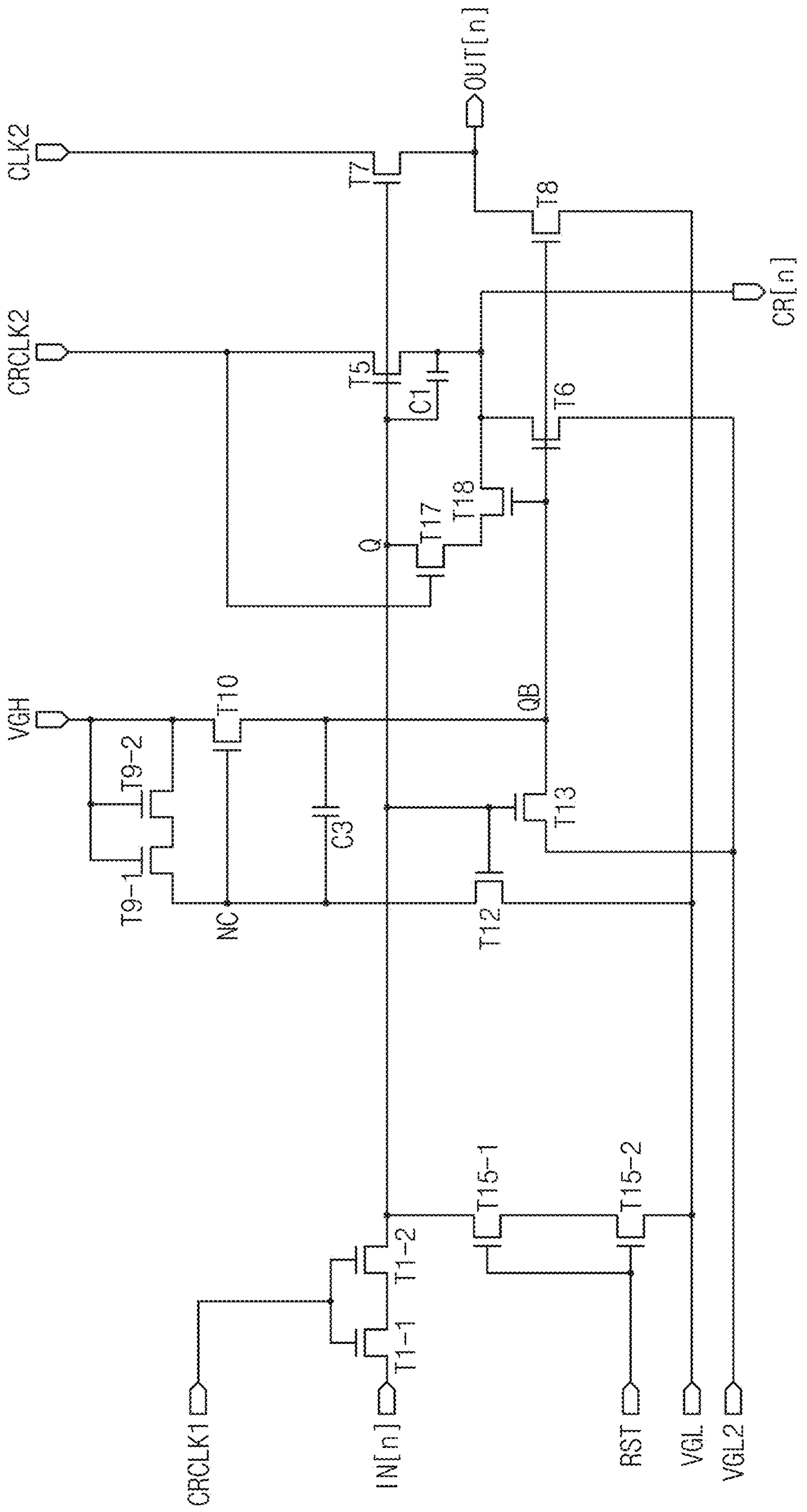
FIG. 21 is a circuit diagram illustrating a stage of a gate driver according to an embodiment of the invention.

FIG. 21 is a circuit diagram illustrating a stage of a gate driver according to an embodiment of the invention.

The embodiment of the stage of the gate driver 300 shown in FIG. 21 is substantially the same as the embodiment of the stage of the gate driver 300 described above with reference to FIG. 18 except that the stage does not include the stabilizing circuit. Thus, the same reference numerals will be used to refer to the same or like parts as those described above with reference to FIGS. 18 and 19 and any repetitive detailed description thereof will be omitted.

Referring to FIG. 21, in an embodiment, the stage may not include the stabilizing circuit T14-1 and T14-2 of FIG. 3.

The stabilizing circuit T14-1 and T14-2 may be omitted depending on characteristics of the display panel 100, the gate driver 300 and the display apparatus. In such an embodiment where the stage of the gate driver 300 does not include the stabilizing circuit T14-1 and T14-2, an area of the stage of the gate driver 300 may be reduced. Thus, a dead space of the display apparatus may be reduced.

According to an embodiment, all transistors in the gate driver 300 may be configured as the N-type transistors. In such an embodiment, the gate driver 300 may not include the P-type transistors but include the N-type transistors only.

In such an embodiment, to prevent the current leakage, the display panel 100 includes the N-type transistors only and the gate driver 300 integrated on the display panel 100 also includes the N-type transistors only so that the manufacturing process may become simplified and the current leakage may be effectively prevented in the gate driver 300. In such an embodiment, the flicker due to the current leakage may be effectively prevented so that the display quality of the display panel 100 may be enhanced.

In addition, the reliability and the stability of the gate output signal OUT[n] may be enhanced and the power consumption may be reduced.

Figure 22:
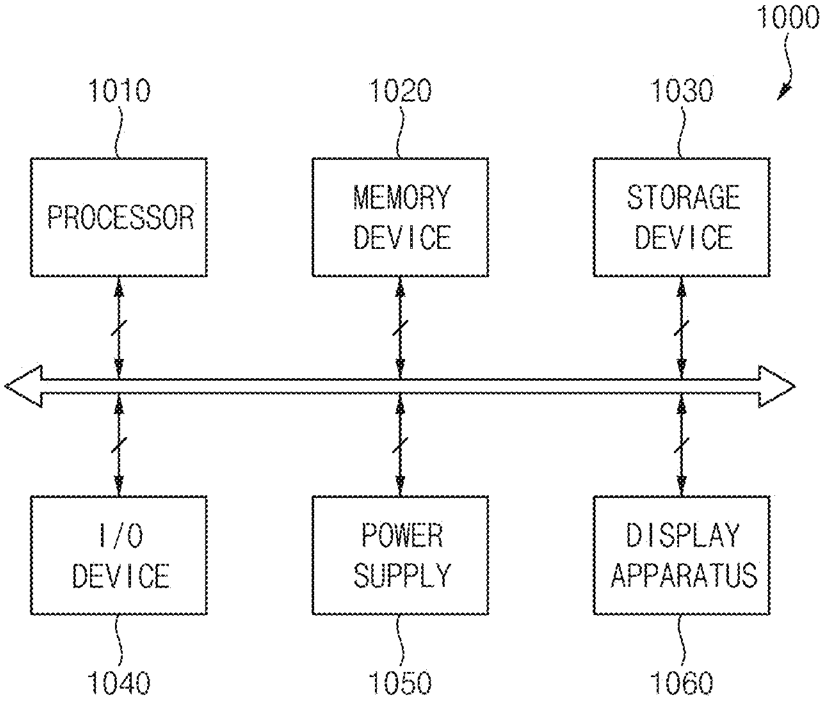
FIG. 22 is a block diagram illustrating an electronic apparatus according to an embodiment of the invention.
Figure 23:
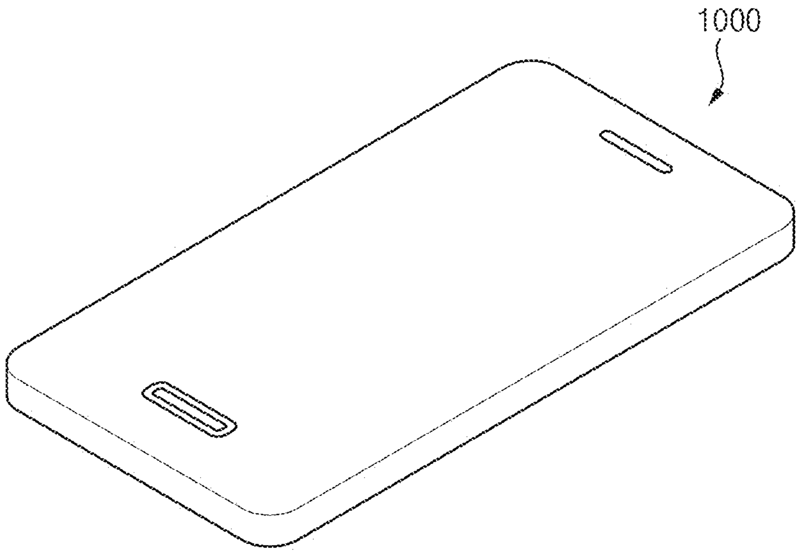
FIG. 23 is a diagram illustrating an embodiment in which the electronic apparatus of FIG. 22 is implemented as a smart phone.

FIG. 22 is a block diagram illustrating an electronic apparatus according to an embodiment of the invention. FIG. 23 is a diagram illustrating an embodiment in which the electronic apparatus of FIG. 22 is implemented as a smart phone.

Referring to FIGS. 22 and 23, an embodiment of the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 23, the electronic apparatus 1000 may be implemented as a smart phone. However, the electronic apparatus 1000 is not limited thereto.

In an embodiment, for example, the electronic apparatus 1000 may be implemented as a cellular phone, a video phone, a smart pad, a smart watch, a tablet computer, a car navigation system, a computer monitor, a laptop, a head mounted display (HMD) device, or the like.

The processor 1010 may perform various computing functions or various tasks. The processor 1010 may be a micro-processor, a central processing unit (CPU), an application processor (AP), or the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. In an embodiment, for example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like. The I/O device 1040 may include an input device such as a keyboard, a keypad, a mouse device, a touch-pad, a touch-screen, or the like and an output device such as a printer, a speaker, or the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

In such an embodiment, the display apparatus 1060 may include a gate driver including a stage according to an embodiment described above, such that the power consumption of the display apparatus may be reduced and the display quality of the display panel may be enhanced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A gate driver comprising:

an input circuit which transmits an input signal to a Q node in response to a first clock signal;

a pull-up circuit which pulls up a gate output signal to a high voltage in response to a signal of a QF node;

a pull-down circuit which pulls down the gate output signal to a first low voltage in response to a QB node;

a QB node control circuit which controls a signal of the QB node based on a QB control signal and a second clock signal; and a Q node control circuit which controls a signal of the Q node based on the QB node, wherein the QB node control circuit comprises:

a first ninth transistor including a control electrode which receives the QB control signal, a first electrode connected to a control electrode of a tenth transistor and a second electrode connected to a ninth intermediate node; and a second ninth transistor including a control electrode which receives the QB control signal, a first electrode connected to the ninth intermediate node and a second electrode which receives the QB control signal.

2. The gate driver of claim 1, further comprising:

a carry pull-up circuit which pulls up a carry signal to the high voltage in response to the signal of the QF node; and a carry pull-down circuit which pulls down the carry signal to a second low voltage less than the first low voltage in response to the signal of the QB node.

3. The gate driver of claim 2, wherein the carry pull-up circuit comprises a fifth transistor including a control electrode connected to the QF node, a first electrode which receives the high voltage and a second electrode connected to a carry output terminal, and wherein the carry pull-down circuit comprises a sixth transistor including a control electrode connected to the QB node, a first electrode which receives the second low voltage and a second electrode connected to the carry output terminal.

4. The gate driver of claim 1, further comprising a boosting circuit which boosts the QF node using the second clock signal in response to the signal of the QF node.

5. The gate driver of claim 4, wherein the boosting circuit comprises:

a fourth transistor including a control electrode connected to the QF node, a first electrode which receives the second clock signal and a second electrode connected to a second electrode of a first capacitor; and the first capacitor including a first electrode connected to the QF node and the second electrode.

6. The gate driver of claim 1, wherein the input circuit comprises:

a first first transistor including a control electrode which receives the first clock signal, a first electrode which receives the input signal and a second electrode connected to a first intermediate node; and a second first transistor including a control electrode which receives the first clock signal, a first electrode connected to the first intermediate node and a second electrode connected to the Q node.

7. The gate driver of claim 1, further comprising a third transistor including a control electrode which receives the high voltage, a first electrode connected to the Q node and a second electrode connected to the QF node.

8. The gate driver of claim 1, wherein the Q node control circuit comprises:

a first second transistor including a control electrode connected to the QB node, a first electrode connected to a second intermediate node and a second electrode connected to the Q node; and a second second transistor including a control electrode connected to the QB node, a first electrode which receives a second low voltage and a second electrode connected to the second intermediate node.

9. The gate driver of claim 8, wherein the second second transistor further includes a second control electrode which receives the second low voltage.

10. The gate driver of claim 1, further comprising a thirteenth transistor which applies a second low voltage to the QB node in response to the signal of the Q node.

11. The gate driver of claim 1, further comprising a reset circuit which applies the first low voltage to the Q node in response to a reset signal.

12. The gate driver of claim 11, wherein the reset circuit comprises:

a second fifteenth transistor including a control electrode which receives the reset signal, a first electrode which receives the first low voltage and a second electrode connected to a fifteenth intermediate node; and a first fifteenth transistor including a control electrode which receives the reset signal, a first electrode connected to the fifteenth intermediate node and a second electrode connected to the Q node.

13. The gate driver of claim 1, wherein the pull-up circuit comprises:

a seventh transistor including a control electrode connected to the QF node, a first electrode which receives the high voltage and a second electrode connected to a gate output terminal; and a second capacitor connected to the control electrode of the seventh transistor and the second electrode of the seventh transistor.

14. The gate driver of claim 1, wherein the QB node control circuit further comprises:

the tenth transistor including the control electrode connected to the first electrode of the first ninth transistor, a first electrode which receives the QB control signal and a second electrode connected to a first electrode of an eleventh transistor; and the eleventh transistor including a control electrode which receives the second clock signal, the first electrode connected to the second electrode of the tenth transistor and a second electrode connected to the QB node.

15. The gate driver of claim 14, wherein the QB node control circuit further comprises:

a third capacitor including a first electrode connected to the control electrode of the tenth transistor and a second electrode connected to the QB node.

16. The gate driver of claim 1, further comprising:

a first first transistor including a control electrode which receives the first clock signal, a first electrode which receives the input signal and a second electrode connected to a first intermediate node;

a second first transistor including a control electrode which receives the first clock signal, a first electrode connected to the first intermediate node and a second electrode connected to the Q node;

a first second transistor including a control electrode connected to the QB node, a first electrode connected to a second intermediate node and a second electrode connected to the Q node;

a second second transistor including a control electrode connected to the QB node, a first electrode which receives a second low voltage and a second electrode connected to the second intermediate node; and a stabilizing circuit which applies the high voltage to the first intermediate node and the second intermediate node in response to the signal of the Q node.

17. The gate driver of claim 16, wherein the stabilizing circuit comprises:

a second fourteenth transistor including a control electrode connected to the Q node, a first electrode connected to a fourteenth intermediate node and a second electrode connected to the first intermediate node and the second intermediate node; and a first fourteenth transistor including a control electrode connected to the Q node, a first electrode which receive the high voltage and a second electrode connected to the fourteenth intermediate node.

18. The gate driver of claim 1, further comprising a boosting circuit which boost the QF node using the second clock signal in response to the signal of the QF node, wherein the boosting circuit comprises:

a fourth transistor including a control electrode connected to the QF node, a first electrode which receives the second clock signal and a second electrode connected to a second electrode of a first capacitor; and the first capacitor including a first electrode connected to the QF node and the second electrode, and wherein the gate driver further comprises a sixteenth transistor which applies the first low voltage to the second electrode of the fourth transistor in response to the first clock signal.

19. The gate driver of claim 1, wherein all transistors in the gate driver are N-type transistors.

20. The gate driver of claim 1, wherein the QB control signal is the high voltage.

21. The gate driver of claim 1, wherein the QB control signal is not the high voltage.

22. The gate driver of claim 1, wherein a high level of the first clock signal is the high voltage, and wherein a low level of the first clock signal is a second low voltage less than the first low voltage.

23. The gate driver of claim 1, wherein a high level of the first clock signal is different from the high voltage, or a low level of the first clock signal is different from a second low voltage less than the first low voltage.

24. A gate driver comprising:

an input circuit which transmits an input signal to a Q node in response to a first carry clock signal;

a pull-up circuit which outputs a second clock signal as a gate output signal in response to a signal of the Q node;

a pull-down circuit which pulls down the gate output signal to a low voltage in response to a signal of a QB node;

a QB node control circuit which controls the signal of the QB node based on a QB control signal; and a Q node control circuit which controls the signal of the Q node based on the signal of the QB node and a second carry clock signal, wherein the QB node control circuit comprises:

a first ninth transistor including a control electrode which receives the QB control signal, a first electrode connected to a control electrode of a tenth transistor and a second electrode connected to a ninth intermediate node; and a second ninth transistor including a control electrode which receives the QB control signal, a first electrode connected to the ninth intermediate node and a second electrode which receives the QB control signal.

25. The gate driver of claim 24, wherein the QB node control circuit further comprises:

the tenth transistor including the control electrode connected to the first electrode of the first ninth transistor, a first electrode which receives the QB control signal and a second electrode connected to the QB node.

26. The gate driver of claim 25, wherein the QB node control circuit further comprises a third capacitor including a first electrode connected to the control electrode of the tenth transistor and a second electrode connected to the QB node.

27. The gate driver of claim 24, wherein the Q node control circuit comprises:

a seventeenth transistor including a control electrode which receives the second carry clock signal, a first electrode connected to the Q node and a second electrode connected to a seventeenth intermediate node; and an eighteenth transistor including a control electrode connected to the QB node, a first electrode connected to the seventeenth intermediate node and a second electrode connected to a carry output terminal.

28. A display apparatus comprising:

a display panel including a pixel;

a gate driver which outputs a gate signal to the pixel;

a data driver which outputs a data voltage to the pixel; and an emission driver which outputs an emission signal to the pixel, wherein the gate driver comprises:

an input circuit which transmits an input signal to a Q node in response to a first clock signal;

a pull-up circuit which pulls up a gate output signal to a high voltage in response to a signal of a QF node;

a pull-down circuit which pulls down the gate output signal to a low voltage in response to a QB node; and a QB node control circuit which controls a signal of the QB node based on a QB control signal and a second clock signal; and a Q node control circuit which controls a signal of the Q node based on the QB node, wherein the QB node control circuit comprises:

a first ninth transistor including a control electrode which receives the QB control signal, a first electrode connected to a control electrode of a tenth transistor and a second electrode connected to a ninth intermediate node; and a second ninth transistor including a control electrode which receives the QB control signal, a first electrode connected to the ninth intermediate node and a second electrode which receives the QB control signal.

* * * * *